(12) United States Patent
Shigeno et al.

(10) Patent No.: US 8,214,915 B2
(45) Date of Patent: Jul. 3, 2012

(54) CANTILEVER, CANTILEVER SYSTEM, SCANNING PROBE MICROSCOPE, MASS SENSOR APPARATUS, VISCOELASTICITY MEASURING INSTRUMENT, MANIPULATION APPARATUS, DISPLACEMENT DETERMINATION METHOD OF CANTILEVER, VIBRATION METHOD OF CANTILEVER AND DEFORMATION METHOD OF CANTILEVER

(75) Inventors: Masatsugu Shigeno, Chiba (JP); Kazutoshi Watanabe, Chiba (JP); Masato Iyoki, Chiba (JP); Naoya Watanabe, Chiba (JP)

(73) Assignee: SII NanoTechnology Inc. (JP)

( * ) Notice: Subject to any disclaimer, the term of this patent is extended or adjusted under 35 U.S.C. 154(b) by 262 days.

(21) Appl. No.: 12/455,556

(22) Filed: Jun. 3, 2009

(65) Prior Publication Data
US 2010/0107284 A1    Apr. 29, 2010

(30) Foreign Application Priority Data
Jun. 10, 2008    (JP) ................................ 2008-152127

(51) Int. Cl.
*G01Q 20/00*    (2010.01)
(52) U.S. Cl. ................................ 850/5; 850/33; 850/50
(58) Field of Classification Search ................ 850/5, 33, 850/7, 50; 73/105
See application file for complete search history.

(56) References Cited

U.S. PATENT DOCUMENTS

| | | | | |
|---|---|---|---|---|
| 4,671,058 A | * | 6/1987 | Yoshida et al. ................. | 60/303 |
| 5,822,285 A | * | 10/1998 | Rugar et al. ................. | 369/44.26 |
| 6,126,311 A | * | 10/2000 | Schuh ............................. | 374/21 |
| 6,457,360 B1 | * | 10/2002 | Daraktchiev et al. ........... | 73/579 |
| 6,642,129 B2 | * | 11/2003 | Liu et al. ....................... | 438/496 |
| 2007/0063613 A1 | * | 3/2007 | Elata et al. .................... | 310/306 |
| 2009/0139340 A1 | * | 6/2009 | King et al. ...................... | 73/766 |

* cited by examiner

*Primary Examiner* — Kiet T Nguyen
(74) *Attorney, Agent, or Firm* — Adams & Wilks

(57) ABSTRACT

Provided is a cantilever that is capable of bending and deforming in an active manner by itself. The cantilever includes: a lever portion having a proximal end that is supported by a main body part; and a resistor member that is formed in the cantilever and generates heat when a voltage is applied, to thereby deform the lever portion by thermal expansion due to the heat.

32 Claims, 10 Drawing Sheets

F I G. 1 3
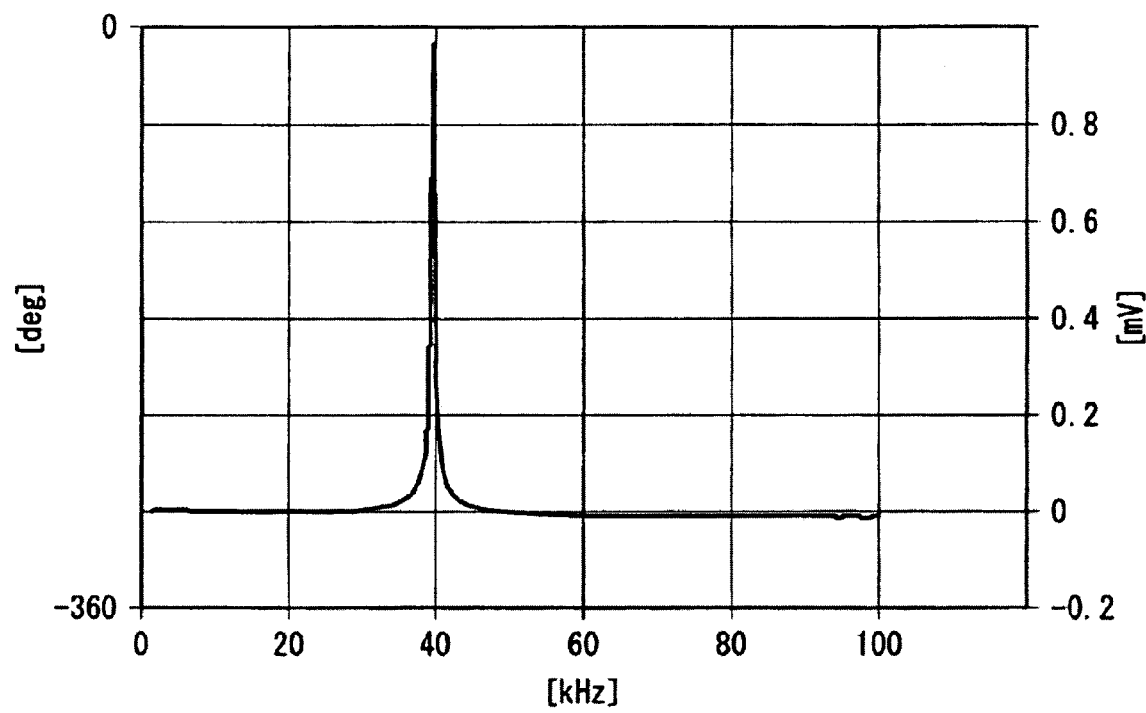

CANTILEVER, CANTILEVER SYSTEM, SCANNING PROBE MICROSCOPE, MASS SENSOR APPARATUS, VISCOELASTICITY MEASURING INSTRUMENT, MANIPULATION APPARATUS, DISPLACEMENT DETERMINATION METHOD OF CANTILEVER, VIBRATION METHOD OF CANTILEVER AND DEFORMATION METHOD OF CANTILEVER

BACKGROUND OF THE INVENTION

1. Field of the Invention

The present invention relates to a cantilever, a cantilever system including the cantilever, a scanning probe microscope including the system, a mass sensor apparatus, an elasticity measuring apparatus, and a manipulation apparatus. In addition, the present invention relates to a cantilever displacement measuring method of measuring a displacement of the cantilever, a cantilever oscillating method of oscillating the cantilever, and a cantilever deforming method of deforming the cantilever.

2. Description of the Related Art

In recent years, as nanotechnology progresses, sensors utilizing a cantilever are proposed, which require techniques of performing shape observation, mass, density, viscoelasticity, magnetic force, potential, current, and optical information measurement, processing, and manipulation. As one of apparatuses for realizing the above-mentioned requirement, there is known a scanning probe microscope (SPM). The scanning probe microscope is an apparatus capable of observing a very small region on a surface of various types of test samples including a metal, a semiconductor, a ceramic, a resin, a high polymer, a biomaterial, and an insulator, and hence observing a surface shape of the test sample and various physical properties thereof such as viscoelasticity at high resolution of an atomic level. Further, the scanning probe microscope can be used in various environments, e.g., in a vacuum, in a gas, in the air, in a liquid, or the like, and hence it is suitably used in a wide spectrum of fields.

In addition, the scanning probe microscope has various measurement modes corresponding to various objects to be measured, so it is necessary to select an optimal measurement mode every time of the measurement. As one of them, there is known an oscillation mode SPM in which a cantilever set in a cantilever holder is oscillated to perform measurement.

Examples of the oscillation mode SPM include a dynamic force mode microscope (DFM or a resonance mode measurement-atomic force microscope), in which a scanning is performed while controlling the distance between a probe and a test sample so that the oscillation amplitude of a resonated cantilever becomes constant, a viscoelastic AFM (VE-AFM or a micro viscoelasticity measurement-atomic force microscope), in which a test sample is oscillated as a small oscillation in a Z direction perpendicular to the surface of the test sample during an AFM operation, or a cantilever is oscillated as a small oscillation in the Z direction perpendicular to the surface of the test sample, to thereby apply a periodical force to the test sample while a deformation amplitude of the cantilever, a sine component, or a cosine component thereof is detected so as to measure a viscoelasticity distribution, and a lateral force modulation friction force microscope (LM-FFM), in which the test sample is oscillated as a lateral oscillation in the horizontal direction that is parallel to the surface of the test sample during the AFM operation, or the cantilever is oscillated as a lateral oscillation in the horizontal direction that is parallel to the surface of the test sample while a torsional oscillation amplitude of the cantilever is detected, to thereby measure a friction force distribution.

Here, in order to oscillate the cantilever, it is common to use a method of oscillating an oscillating source that is attached to a periphery of the cantilever (e.g., a cantilever holder) and transmitting the oscillation to the cantilever so that the cantilever is oscillated at a predetermined frequency and amplitude (see Japanese Patent No. 3222410). Alternatively, another method is also adopted in some quarters, in which a magnetic member is attached to the cantilever in place of the oscillating source, and a magnetic field generated by the magnetic member is utilized for oscillating the cantilever.

However, the conventional measuring method according to the oscillation mode SPM has yet the following problems.

Specifically, in the method of utilizing the oscillating source for oscillating the cantilever, the oscillation of the oscillating source also propagates to peripheral structural members other than the cantilever so as to cause the peripheral structural members to be oscillated. Therefore, the oscillation characteristic of the cantilever is affected to be different from ideal oscillation state. As a result, it is difficult to identify resonance characteristics of the cantilever correctly, and it is difficult to set correctly an oscillation frequency, an oscillation amplitude, and a phase oscillation characteristic. Therefore, it is difficult to measure the test sample with high accuracy.

On the other hand, the method of utilizing the magnetic member for oscillating the cantilever has some inconveniences as described below.

First, because it is necessary to attach the magnetic member to the cantilever, a material of the cantilever is limited. Therefore, it is impossible to select an optimal cantilever from various cantilevers having various oscillation characteristics, which causes an inconvenience that the selection range is narrowed.

In addition, because a mechanism for generating a magnetic field is necessary as a structure of the apparatus, the mechanism leads to an increase in cost. In addition, heat is generated when the magnetic field is generated. Therefore, an influence of the heat causes generation of a drift, which may cause a decrease in resolution. Further, because it is necessary to install a mechanism for generating the magnetic field, the apparatus structure becomes a large scale, which deteriorates the entire stiffness, leading to a decrease in resolution and a decrease in operation speed. In addition, the installation of the mechanism for generating the magnetic field may suffer a limitation of space such as a decrease in the measurement region, a limitation of the movable range, or a disturbance of parallel use of an optical microscope because upper and lower spaces of the cantilever are occupied by the mechanism.

Here, oscillating the cantilever means deforming repeatedly and periodically the cantilever. Noting this deformation, generally, the cantilever does not deform by itself but is deformed by an external factor. In other words, the cantilever is bent and deformed when a repulsive force or an attractive force is exerted by the test sample, or when a micro-substance or the like is adhered. However, recently, there is often a demand for a self-active deformation of the cantilever in order to perform more multidirectional observation or measurement. Conventional cantilevers cannot meet such a demand.

SUMMARY OF THE INVENTION

The present invention has been made in view of the above-mentioned circumstances, and it is a primary object of the present invention to provide a cantilever and a cantilever system that can bend and deform in an active manner by itself and can be oscillated without using an oscillating source or a magnetic member.

Also, another object of the present invention is to provide a scanning probe microscope including the cantilever system, a mass sensor apparatus, an elasticity measuring apparatus, a manipulation apparatus, a cantilever oscillating method of oscillating the cantilever, and a cantilever displacement measuring method of measuring a displacement of the cantilever.

The present invention provides the following means for solving the problems.

According to an aspect of the present invention, there is provided a cantilever comprising: a lever portion having a proximal end that is supported by a main body part; and a resistor member formed in the lever portion for generating heat through application of a voltage and deforming the lever portion by thermal expansion due to the heat.

In the cantilever according to the aspect of the present invention, the resistor member generates heat when a voltage is applied. Then, the heat causes a thermal expansion locally in a periphery of the resistor member, which leads to a deformation of the lever portion. Thus, the lever portion can be bent and deformed by itself in a forced manner by utilizing the thermal expansion. Therefore, the cantilever can be used in a way different from the conventional way. For instance, it is possible to press a tip of the lever portion to the test sample forcedly or otherwise separate the tip from the test sample. Thus, the cantilever can be used in various ways different from the conventional way, thereby providing a cantilever that is superior in convenience.

According to another aspect of the present invention, in the cantilever according to the above-mentioned aspect of the invention, the lever portion has a thermal expansion portion formed therein in part in a vicinity of the resistor member, the thermal expansion portion being made of a material having a thermal expansion coefficient larger than that of the lever portion.

In the cantilever according to the aspect of the present invention, because the thermal expansion portion is formed in a vicinity of the resistor member, the thermal expansion portion expands thermally in an active manner under the effect of the heat generated by the resistor member. Therefore, the lever portion can be deformed efficiently with a low heat value, thereby making it possible to save power.

According to further another aspect of the present invention, in the cantilever according to the above-mentioned aspect of the invention, the thermal expansion portion is formed on one of both sides of the lever portion.

In the cantilever according to the aspect of the present invention, because the thermal expansion portion is formed on one surface side of the lever portion, the one surface side expands or contracts largely under the effect of the heat so as to be displaced actively. Therefore, the lever portion can be deformed more efficiently.

According to further another aspect of the present invention, in the cantilever according to the above-mentioned aspect of the invention, the thermal expansion portion is made of an insulating material.

In the cantilever according to the aspect of the present invention, because the thermal expansion portion has insulating properties, no effect is exerted on electric characteristics even if the thermal expansion portion contacts directly with the resistor member. Therefore, the thermal expansion portion can be formed regardless of the position where the resistor member is formed. Thus, it is possible to improve flexibility in designing the cantilever.

According to further another aspect of the present invention, in the cantilever according to the above-mentioned aspect of the invention, the lever portion includes a self displacement sensing lever.

In the cantilever according to the aspect of present invention, because the lever portion includes a self displacement sensing lever, it is possible to grasp reliably the degree of deformation of the lever portion itself. Therefore, it is possible to grasp a deformation state of the lever portion without using an optical lever method. Thus, an alignment work that is specific to the optical lever method is not necessary, so it provides good usability.

According to further another aspect of the present invention, in the cantilever according to the above-mentioned aspect of the invention, the lever portion includes the self displacement sensing lever provided with a first strain resistor having a resistance value that changes in accordance with a displacement amount.

In the cantilever according to the aspect of the present invention, when the lever portion is bent and deformed, the resistance value of the first strain resistor changes in accordance with the displacement amount. Therefore, by monitoring a value of current flowing in the first strain resistor, it is possible to grasp reliably the degree of deformation of the lever portion. Therefore, the deformation of the lever portion can be controlled with high accuracy.

In particular, the operation of deforming the lever portion utilizing the heat and the operation of checking the deformation of the lever portion in accordance with a variation in the resistance value due to the deformation can be performed simultaneously, thereby making the cantilever very easy to use.

According to another aspect of the present invention, there is provided a cantilever system comprising: the above-mentioned cantilever according to the invention; a voltage applying portion for applying a voltage to the resistor member; and a displacement measuring mechanism for measuring a displacement of the lever portion.

In the cantilever system according to the aspect of the present invention, the voltage applying portion applies a voltage to the resistor member, and hence heat generated by the resistor member can be used for deforming the lever portion. In addition, because the displacement measuring mechanism measures a displacement of the lever portion, the deformation of the lever portion can be controlled with high accuracy. In addition, based on a result of the measurement by the displacement measuring mechanism, various types of measurement or observation (e.g., surface shape observation of the test sample or measurement of a magnetic or potential distribution of the test sample) can be performed.

According to another aspect of the present invention, there is provided a cantilever system comprising: the above-mentioned cantilever according to the invention; a voltage applying portion for applying a voltage to the resistor member; and a displacement measuring mechanism for measuring a displacement of the lever portion based on a change in value of a current flowing in the first strain resistor.

In the cantilever system according to the aspect of the present invention, a voltage applying portion applies a voltage to the resistor member, and hence heat generated by the resistor member can be used for deforming the lever portion. In addition, when the lever portion is bent and displaced, a resistance value of the first strain resistor changes in accordance with the displacement amount. Therefore, the displacement measuring mechanism can measure reliably the displacement of the lever portion based on a change in value of a current flowing in the first strain resistor. Therefore, the deformation of the lever portion can be controlled with high accuracy. In addition, based on a result of the measurement by the displacement measuring mechanism, various types of measurement or observation (e.g., surface shape observation of the test sample or measurement of a magnetic or potential distribution of the test sample) can be performed.

In particular, because the lever portion is a self displacement type lever, it is not necessary to adopt a common method of the optical lever method or the like when measuring the displacement of the lever portion. Therefore, the structure of the displacement measuring mechanism can be simplified, and various measurements can be performed quickly and readily by using the cantilever.

According to further another aspect of the present invention, in the cantilever system according to the above-mentioned aspect of the invention, the voltage applying portion, which includes a square root circuit for computing a square root of a voltage value, converts a voltage signal that is proportional to an amount to be deformed by the square root circuit into a voltage, and applies the voltage to the resistor member.

In the cantilever system according to the aspect of the present invention, when a voltage is applied to the resistor member, the voltage applying portion first computes a square root (root operation) of a voltage signal that is proportional to the amount desired to be deformed once with a square root circuit. Then, the voltage applying portion applies a voltage corresponding to the voltage signal after the computation to the resistor member. Here, the lever portion is deformed by the heat generated by the resistor member as described above, and the deformation amount is proportional to electric power corresponding to the heat value. In other words, the deformation amount increases when the electric power is increased. The electric power is expressed by $W=V^2/R$ (where V denotes a voltage value, and R denotes a resistance value), so the deformation amount increases in proportion to the square of the voltage value.

Here, as described above, the voltage applying portion uses the voltage corresponding to the voltage signal obtained by the square root operation performed by the square root circuit as the voltage to be applied corresponding to V in the above expression. Therefore, the lever portion can be deformed in proportion to an input voltage in appearance. Therefore, even if the thermal expansion is used for deforming the cantilever, the voltage adjustment can be performed similarly to the conventional method, which makes the system easier to handle, thereby further improving the usability.

According to further another aspect of the present invention, in the cantilever system according to the above-mentioned aspect of the invention, the voltage applying portion increases the voltage to compensate a temperature decrease of the resistor member due to thermal radiation, and applies the increased voltage to the resistor member.

In the cantilever system according to the aspect of the present invention, in applying a voltage to the resistor member, the voltage applying portion applies a little high voltage to the resistor member considering in advance a temperature decrease of the resistor member due to thermal radiation. Thus, even if a temperature decreases due to thermal radiation, the thermal expansion of the resistor member can be performed at a desired temperature so that the lever portion can be deformed as intended.

According to further another aspect of the present invention, in the cantilever system according to the above-mentioned aspect of the invention, the voltage applying portion increases the voltage to compensate a temperature decrease of the resistor member due to a delay in thermal conduction, and applies the increased voltage to the resistor member.

In the cantilever system according to the aspect of the present invention, in applying a voltage to the resistor member, the voltage applying portion applies a little high voltage to the resistor member considering in advance a temperature decrease of the resistor member due to a delay in thermal conduction. Thus, the voltage to be applied can have a waveform with steep leading edge, and the lever portion can be deformed as intended even if a delay occurs in thermal conduction.

According to further another aspect of the present invention, in the cantilever system according to the above-mentioned aspect of the invention, the voltage applying portion applies a voltage to the first strain resistor to cause the first strain resistor to generate heat, so as to cause the first strain resistor to operate as the resistor member.

In the cantilever system according to the aspect of the present invention, the first strain resistor can operate as the resistor member. In other words, the first strain resistor does double duty, i.e., a duty to deform the lever portion by heat and a duty to measure a displacement of the lever portion. Therefore, a structure of the cantilever can be simplified, and cost for manufacturing the cantilever can be reduced.

According to further another aspect of the present invention, in the cantilever system according to the above-mentioned aspect of the invention, the displacement measuring mechanism detects a voltage applied to the first strain resistor by the voltage applying portion and a change in resistance value of the first strain resistor due to a current generated by the voltage, and measures a displacement of the lever portion based on the voltage and the change thus detected.

In the cantilever system according to the aspect of the present invention, heating and measuring can be performed simultaneously only by applying a voltage to the first strain resistor. Therefore, complicated control is not necessary, which results in easy handling.

According to further another aspect of the present invention, in the cantilever system according to the above-mentioned aspect of the invention, the cantilever includes a temperature compensating reference electrode in which a second strain resistor is incorporated, and the displacement measuring mechanism measures a displacement of the lever portion based on values of currents flowing in the first strain resistor and the second strain resistor.

In the cantilever system according to the aspect of the present invention, the displacement measuring mechanism compares a value of current flowing in the first strain resistor formed in the lever portion with a value of current flowing in the second strain resistor incorporated in the temperature compensating reference electrode so as to compute a difference between the first and second strain resistors. Then, the displacement of the lever portion is measured based on the difference between the two current values.

Here, a resistance value of the first strain resistor varies in accordance with not only the displacement of the lever portion but also temperature change. However, because the displacement measuring mechanism is referring to a value of current flowing in the second strain resistor on the side of the temperature compensating reference electrode, unnecessary change in the resistance value due to the temperature change can be cancelled so that the influence of temperature can be eliminated. Therefore, it is possible to perform various measurements accurately, utilizing the cantilever.

According to further another aspect of the present invention, in the cantilever system according to the above-mentioned aspect of the invention, the displacement measuring mechanism measures a difference in value between currents flowing in the first strain resistor and the second strain resistor by using a Wheatstone bridge circuit.

In the cantilever system according to the aspect of the present invention, a Wheatstone bridge circuit is used, which makes it possible to detect readily and correctly a difference between a value of current flowing in the first strain resistor formed in the lever portion and a value of current flowing in the second strain resistor incorporated in the temperature compensating reference electrode.

According to further another aspect of the present invention, in the cantilever system according to the above-mentioned aspect of the invention, the displacement measuring mechanism measures a difference in value between currents flowing in the first strain resistor and the second strain resistor by using a differential amplifier circuit.

In the cantilever system according to the present invention, a differential amplifier circuit that is used in an operational amplifier or the like is utilized, which makes it possible to detect readily and correctly a difference between a value of current flowing in the first strain resistor formed in the lever portion and a value of current flowing in the second strain resistor incorporated in the temperature compensating reference electrode.

According to further another aspect of the present invention, in the cantilever system according to the above-mentioned aspect of the invention, the voltage applying portion periodically applies an AC voltage having an amplitude center line that is offset from the voltage center line so that the lever portion oscillates at a frequency close to a resonance frequency in one of a positive voltage region and a negative voltage region.

In the cantilever system according to the aspect of the present invention, the voltage applying portion applies a voltage periodically to the lever portion. Thus, the lever portion is not just simply deformed but repeatedly deformed, which results in an oscillated state. In addition, the lever portion is oscillated at a frequency close to the resonance frequency (frequency of the primary resonance or a high order resonance). Therefore, various types of measurement or observation (e.g., surface shape observation of the test sample or measurement of a magnetic or potential distribution of the test sample) can be performed in the oscillation mode of oscillating the lever portion.

In addition, an AC voltage to be applied has an amplitude center line that is offset from a voltage center line so as to oscillate in a positive voltage region or in a negative voltage region. In this case, the resistor member generates the highest heat at the peak point on the positive side in the sine wave of the AC voltage while the resistor member generates the lower heat at the peak point on the negative side. In other words, the lever portion is deformed and bent to the maximum every time the sine wave reaches the peak point on the positive side. Therefore, the lever portion can be oscillated in a cycle substantially the same as that of the AC voltage. As a result, the cantilever can be oscillated reliably at a frequency close to the resonance frequency. In particular, the lever portion can be oscillated reliably with ease at the resonance frequency only by the offset adjustment of the frequency of the AC voltage.

In addition, because the thermal expansion is utilized for the oscillation, the lever portion itself can be directly oscillated without transmitting any oscillation to peripheral components of the cantilever unlike the case where an oscillating source or a magnetic field is used for oscillating the lever. Therefore, resonance characteristics of a single cantilever can be obtained. Therefore, an ideal Q curve that does not contain unnecessary noise or the like can be obtained in Q curve measurement, so the resonance characteristics of the cantilever can be identified correctly. Therefore, it is possible to perform correct setting with respect to the oscillation characteristics of the cantilever including an oscillation frequency, an amplitude, a phase, and the like.

According to further another aspect of the present invention, in the cantilever system according to the above-mentioned aspect of the invention, the voltage applying portion periodically applies an AC voltage set so that the lever portion oscillates at a frequency that is substantially a half of the resonance frequency across a positive voltage region and a negative voltage region.

In the cantilever system according to the aspect of the present invention, the voltage applying portion applies a voltage to the lever portion periodically. Thus, the lever portion is not just deformed but repeatedly deformed, which results in an oscillated state. In addition, the voltage applying portion applies an AC voltage that has a frequency substantially a half of the resonance frequency of the lever portion and is set to oscillate across the positive voltage region and the negative voltage region. In this case, the resistor member generates the highest heat both at the peak point on the positive side and at the peak point on the negative side in the sine wave of the AC voltage. In other words, the lever portion is deformed and bent to the maximum in the same direction every time the sine wave reaches the both points. Therefore, the lever portion can be oscillated in a cycle half as that of the AC voltage. As a result, the cantilever can be oscillated at a frequency close to the resonance frequency. In particular, the lever portion can be oscillated reliably at the resonance frequency only by adjusting the frequency of the AC voltage, thereby making the setting easy.

According to further another aspect of the present invention, in the cantilever system according to the above-mentioned aspect of the invention, the voltage applying portion and the displacement measuring mechanism are operated alternately in a time cycle.

In the cantilever system according to the aspect of the present invention, because the deformation of the lever portion and the measurement of the lever portion are performed alternately in a time cycle, each of the operations can be performed stably and reliably.

According to further another aspect of the present invention, in the cantilever system according to the above-mentioned aspect of the invention, the voltage applying portion and the displacement measuring mechanism are operated alternately in a time cycle satisfying the expression below, $$S \leq q/f,$$

where S denotes the time cycle, q denotes the Q value, and f denotes the resonance frequency of the cantilever.

In the cantilever system according to the aspect of the present invention, because the oscillation of the lever portion and the measurement of the lever portion are performed alternately in a time cycle, each of the operations can be performed stably and reliably. In particular, because the time interval S is set to a value of (Q value)/(resonance frequency) or smaller, the lever portion can be oscillated again without attenuated extremely. Therefore, the lever portion can be maintained reliably in the resonated state.

According to further another aspect of the present invention, the cantilever system according to the above-mentioned aspect of the invention comprises a plurality of the cantilevers, wherein each of the plurality of cantilevers has a probe on the tip of the lever portion that is disposed to be opposed to a test sample, and the voltage applying portion applies a voltage to the resistor member to cause the resistor member to generate heat, the resistor member being formed in at least one cantilever selected arbitrarily from the plurality of cantilevers, so as to cause the probe to be forcedly brought into one of a contact state and a separate state with respect to the test sample.

In the cantilever system according to the aspect of the present invention, only the lever portion of a cantilever selected arbitrarily from the plurality of cantilevers can be deformed so that a probe formed on the tip of the lever portion can contact with the test sample or separate from the same in a forced manner. Thus, it is possible to use in various ways utilizing the thermal expansion.

The present invention also provides a scanning probe microscope which comprises the cantilever system according to the above-mentioned aspects of the present invention.

The present invention also provides a mass sensor apparatus which comprises the cantilever system according to the above-mentioned aspects of the present invention.

The present invention also provides an elasticity measuring apparatus which comprises the cantilever system according to the above-mentioned aspects of the present invention.

The present invention also provides a manipulation apparatus which comprises the cantilever system according to the above-mentioned aspects of the present invention.

With the scanning probe microscope, the mass sensor apparatus, the elasticity measuring apparatus, and the manipulation apparatus according to the present invention including the cantilever system described above, the lever portion can be deformed by utilizing heat generated by the resistor member, and various types of measurement or observation can be performed based on a result of measurement obtained by the displacement measuring mechanism.

According to another aspect of the present invention, there is provided a cantilever displacement measuring method of measuring a displacement of the cantilever according to the above-mentioned aspect of the invention, the method comprising: applying a voltage to the resistor member; and measuring a displacement of the lever portion based on a change in value of a current flowing in the first strain resistor.

In the cantilever displacement measuring method according to the aspect of the present invention, a voltage is applied to the resistor member to displace the lever portion, and a resistance value of the first strain resistor changes in accordance with the displacement amount. Therefore, the displacement of the lever portion can be measured reliably based on the change in value of a current flowing in the first strain resistor. Thus, the deformation of the lever portion can be controlled with high accuracy. In particular, it is not necessary to adopt a common method of the optical lever method or the like when measuring the displacement of the lever portion.

According to the cantilever displacement measuring method of the present invention, the cantilever displacement measuring method according to the above-mentioned aspect of the invention further comprises applying a voltage to the first strain resistor to cause the first strain resistor to generate heat and operate as the resistor member.

In the cantilever displacement measuring method according to the aspect of the present invention, the first strain resistor can operate as the resistor member. In other words, the first strain resistor does double duty, i.e., a duty to deform the lever portion by heat and a duty to measure a displacement of the lever portion.

According to the cantilever displacement measuring method of the present invention, the cantilever displacement measuring method according to the above-mentioned aspect of the invention further comprises detecting the voltage applied to the first strain resistor and the change of a resistance value of the first strain resistor based on a current generated by the voltage, to thereby measure a displacement of the lever portion.

In the cantilever displacement measuring method according to the aspect of the present invention, heating and measuring can be performed simultaneously only by applying a voltage to the first strain resistor. Therefore, complicated control is not necessary, which results in easy handling.

According to the cantilever displacement measuring method of the present invention, the cantilever displacement measuring method according to the above-mentioned aspect of the invention further comprises referring to a temperature compensating reference electrode in which the second strain resistor is incorporated, and measuring a displacement of the lever portion based on a difference in value between currents flowing in the first strain resistor and the second strain resistor.

In the cantilever displacement measuring method according to the aspect of the present invention, a value of current flowing in the first strain resistor formed in the lever portion is compared with a value of current flowing in the second strain resistor incorporated in a temperature compensating reference electrode so as to compute a difference therebetween. Then, the displacement of the lever portion is measured based on the difference between the two current values. Here, a resistance value of the first strain resistor varies in accordance with not only the displacement of the lever portion but also temperature change. However, because a value of current flowing in the second strain resistor provided on the side of the temperature compensating reference electrode is referred to, unnecessary change in the resistance value due to the temperature change can be cancelled so that the influence of temperature can be eliminated. Therefore, it is possible to measure the displacement of the lever portion more precisely.

According to the cantilever displacement measuring method of the present invention, in the cantilever displacement measuring method according to the above-mentioned aspect of the invention, the difference in value between currents flowing in the first strain resistor and the second strain resistor is measured using a Wheatstone bridge circuit.

In the cantilever displacement measuring method according to the aspect of the present invention, a Wheatstone bridge circuit is used, which makes it possible to detect readily and correctly a difference between a value of current flowing in the first strain resistor formed in the lever portion and a value of current flowing in the second strain resistor incorporated in the temperature compensating reference electrode.

According to the cantilever displacement measuring method of the present invention, in the cantilever displacement measuring method according to the above-mentioned aspect of the invention, the difference in value between currents flowing in the first strain resistor and the second strain resistor is measured using a differential amplifier circuit.

In the cantilever displacement measuring method according to the aspect of the present invention, a differential amplifier circuit that is used in an operational amplifier or the like is utilized, which makes it possible to detect readily and correctly a difference between a value of current flowing in the first strain resistor formed in the lever portion and a value of current flowing in the second strain resistor incorporated in the temperature compensating reference electrode.

The present invention also provides a cantilever oscillating method of oscillating the above-mentioned cantilever according to the invention, the method comprising applying an AC voltage to the lever portion periodically, the AC voltage having a frequency close to a resonance frequency and an amplitude center line that is offset from voltage center line so as to oscillate in one of a positive voltage region and a negative voltage region.

In the cantilever oscillating method according to the present invention, a voltage is applied periodically to the lever portion. Thus, the lever portion is not just simply deformed but repeatedly deformed, which results in the oscillated state. In addition, the lever portion is oscillated at a frequency close to the resonance frequency (frequency of the primary resonance or a high order resonance). Therefore, various types of measurement or observation (e.g., surface shape observation of the test sample or measurement of a magnetic or potential distribution of the test sample) can be performed in the oscillation mode of oscillating the lever portion.

In addition, an AC voltage to be applied has an amplitude center line that is offset from a voltage center line so as to oscillate in a positive voltage region or in a negative voltage region. In this case, the resistor member generates the highest heat at the peak point on the positive side in the sine wave of the AC voltage while the resistor member generates the lower heat at the peak point on the negative side. In other words, the lever portion is deformed and bent to the maximum every time the sine wave reaches the peak point on the positive side. Therefore, the lever portion can be oscillated in a cycle substantially the same as that of the AC voltage. As a result, the cantilever can be oscillated reliably at a frequency close to the resonance frequency. In particular, the lever portion can be oscillated reliably with ease at the resonance frequency only by the offset adjustment of the frequency of the AC voltage.

In addition, because the thermal expansion is utilized for the oscillation, the lever portion itself can be directly oscillated without transmitting any oscillation to peripheral components of the cantilever unlike the case where an oscillating source or a magnetic field is used for oscillating the lever. Therefore, resonance characteristics of a single cantilever can be obtained. Therefore, an ideal Q curve that does not contain unnecessary noise or the like can be obtained in Q curve measurement, so the resonance characteristics of the cantilever can be identified correctly. Therefore, it is possible to perform correct setting with respect to the oscillation characteristics of the cantilever including an oscillation frequency, an amplitude, a phase, and the like.

The present invention also provides a cantilever oscillating method of oscillating the above-mentioned cantilever according to the invention, the method comprising applying an AC voltage to the lever portion periodically, the AC voltage having a frequency that is substantially a half of a resonance frequency and being set so as to oscillate across a positive voltage region and a negative voltage region.

In the cantilever oscillating method according to the present invention, a voltage is applied to the lever portion periodically. Thus, the lever portion is not just simply deformed but repeatedly deformed, which results in an oscillated state. In addition, the voltage applying portion applies an AC voltage that has a frequency substantially a half of the resonance frequency of the lever portion and is set to oscillate across the positive voltage region and the negative voltage region. In this case, the resistor member generates the highest heat both at the peak point on the positive side and at the peak point on the negative side in the sine wave of the AC voltage. In other words, the lever portion is deformed and bent to the maximum in the same direction every time when reaching the both points. Therefore, the lever portion can be periodically oscillated twice in every cycle period of the AC voltage. As a result, the cantilever can be oscillated at a frequency close to the resonance frequency. In particular, the lever portion can be oscillated reliably at the resonance frequency only by adjusting the frequency of the AC voltage, which makes the setting easy.

The present invention also provides a cantilever deforming method of deforming the above-mentioned cantilever according to the invention, the method comprising: computing a square root of a voltage signal that is proportional to an amount to be deformed; and applying a voltage corresponding to the obtained voltage signal to the resistor member.

In the cantilever deforming method according to the present invention, in applying a voltage to the resistor member, a voltage signal that is proportional to the amount desired to be deformed is first subjected once to a square root computation (root operation). Then, a voltage corresponding to the voltage signal after the computation is applied to the resistor member. Here, the lever portion is deformed by causing the resistor member to generate heat, and the deformation amount is proportional to an electric power corresponding to the heat value. In other words, the deformation amount increases when the electric power is increased. The electric power is expressed by $W=V^2/R$ (where V denotes a voltage value, and R denotes a resistance value), so the deformation amount increases in proportion to the square of the voltage value.

Here, a voltage corresponding to the voltage signal obtained by the square root operation is used as the voltage to be applied corresponding to V in the above expression. Therefore, the lever portion can be deformed in proportion to an input voltage in appearance. Therefore, even if the thermal expansion is used for deforming the cantilever, the voltage adjustment can be performed similarly to the conventional method. Thus, it becomes easier to handle, and the usability can be further improved.

The present invention also provides a cantilever deforming method of deforming the above-mentioned cantilever according to the invention, the method comprising, in applying the voltage to the resistor member, increasing the voltage so as to compensate a temperature decrease of the resistor member due to thermal radiation and applying the increased voltage.

In the cantilever deforming method according to the present invention, in applying a voltage to the resistor member, the voltage applying portion applies a little high voltage to the resistor member considering in advance a temperature decrease of the resistor member due to thermal radiation. Thus, even if a temperature decrease occurs due to thermal radiation, the thermal expansion of the resistor member can be performed at a desired temperature so that the lever portion can be deformed as intended.

The present invention also provides a cantilever deforming method of deforming the above-mentioned cantilever according to the invention, the method comprising, in applying the voltage to the resistor member, increasing the voltage so as to compensate a temperature decrease of the resistor member due to a delay in thermal conduction and then applying the increased voltage.

In the cantilever deforming method according to the present invention, in applying a voltage to the resistor member, the voltage applying portion applies a little high voltage to the resistor member considering in advance a temperature decrease of the resistor member due to a delay in thermal conduction. Thus, the voltage to be applied can have a waveform with steep leading edge, and the lever portion can be deformed as intended even if a delay occurs in the thermal conduction.

According to the cantilever of the present invention, the lever portion can be bent and deformed by itself in a forced manner utilizing thermal expansion of the resistor member.

In addition, according to the cantilever system, the scanning probe microscope, the mass sensor apparatus, the elasticity measuring apparatus, and the manipulation apparatus of the present invention, the deformation of the lever portion can be controlled with high accuracy, and various types of measurement and observation can be performed.

In addition, according to the cantilever displacement measuring method of the present invention, the displacement of the lever portion can be measured reliably without adopting a common method of the optical lever method or the like.

In addition, according to the cantilever oscillating method of the present invention, the lever portion can be oscillated without using an oscillating source or a magnetic field. Therefore, the resonance characteristics of the cantilever can be identified correctly.

In addition, according to the cantilever deforming method of the present invention, the lever portion can be bent and deformed in an active manner by itself utilizing the heat generated by the resistor member.

BRIEF DESCRIPTION OF THE DRAWINGS

In the accompanying drawings:

FIG. 13 illustrates a Q curve when the lever portion is oscillated by applying an AC voltage having an amplitude center line that is offset from a voltage center line (0 volts line) in a positive voltage region so as not to cross the 0 volts line to the heat generating resistor member formed in the lever portion.

DETAILED DESCRIPTION OF THE PREFERRED EMBODIMENTS

First Embodiment

Now, a first embodiment of the present invention is described with reference to FIGS. 1 to 5. Note that this embodiment is described with an example of the case where a cantilever system 9 including a cantilever 2 is applied to a scanning probe microscope 1. In addition, this embodiment is described with an example of the case where a lever portion 10c is oscillated, and a displacement of the lever portion 10c in an oscillation state is detected with an optical lever method, and the side of a test sample S is moved in three dimensional directions as a test sample scanning method.

Figure 1:
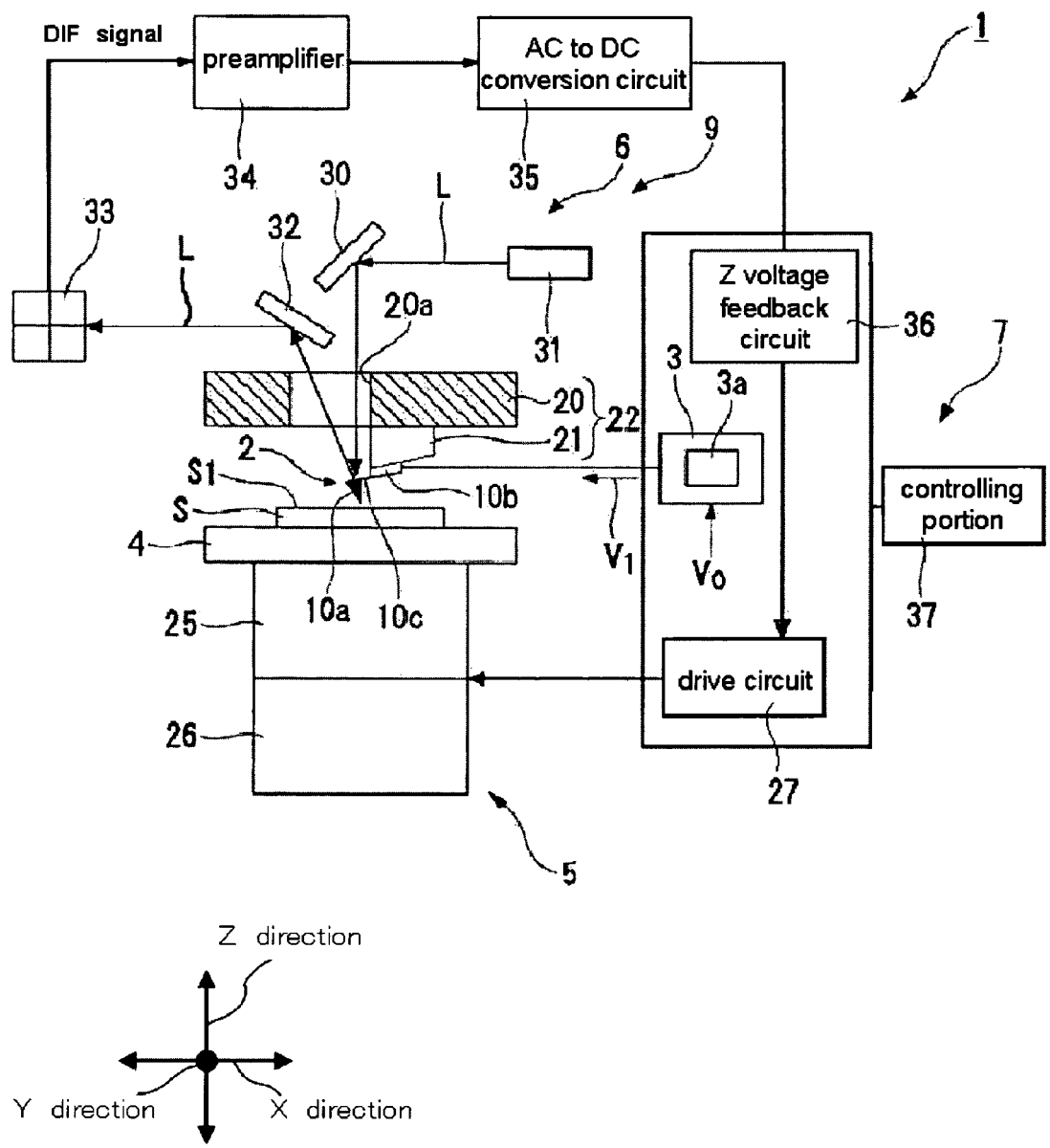
FIG. 1 is a block diagram of a scanning probe microscope illustrating a first embodiment of the present invention.

The scanning probe microscope 1 of this embodiment is an apparatus for measuring a surface shape and various physical properties of the test sample S. The scanning probe microscope 1 includes, as illustrated in FIG. 1, the cantilever 2, a voltage applying portion 3, a stage 4, a moving mechanism 5, a displacement measuring mechanism 6, and a control mechanism 7. Among them, the cantilever 2, the voltage applying portion 3, and the displacement measuring mechanism 6 have a function as the cantilever system 9.

Figure 2:
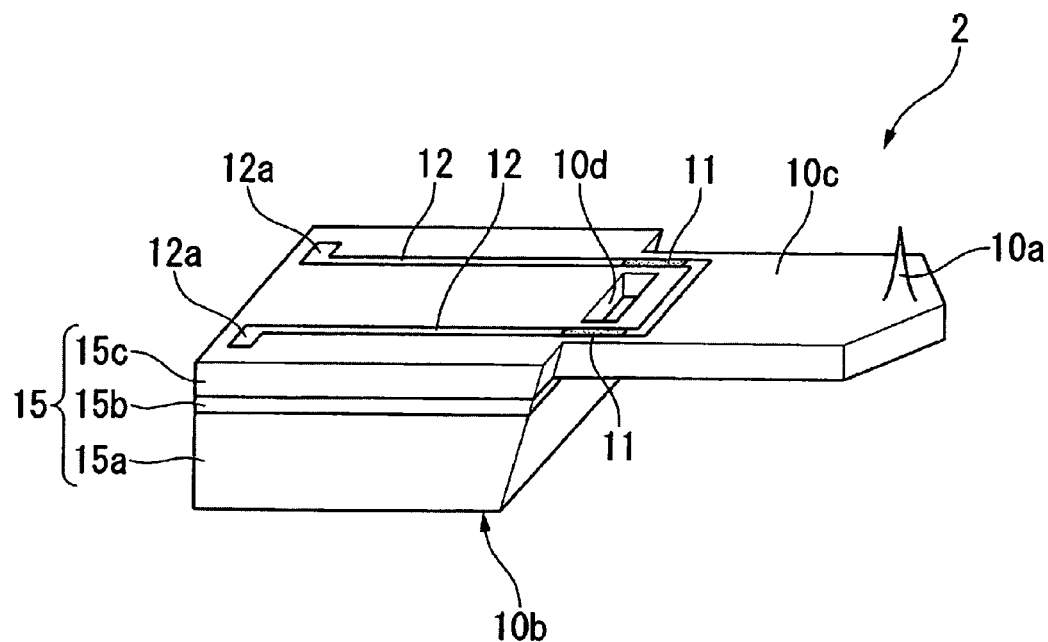
FIG. 2 is a perspective view of a cantilever constituting a cantilever system illustrated in FIG. 1.

The cantilever 2, as illustrated in FIG. 2, includes the lever portion 10c which includes a probe 10a at a distal end portion or tip thereof and is supported by a main body part 10b on a proximal end portion or side thereof in a cantilever manner, a heat generating resistor member (or a resistor member) 11 formed in the lever portion 10c, and a wiring part 12 that is connected electrically to the heat generating resistor member 11. This cantilever 2 is manufactured by using an SOI substrate 15 that includes, for example, a silicon support layer 15a, an oxide layer (silicon oxide film) 15b formed on the silicon support layer 15a, and a silicon active layer 15c that is thermally bonded onto the oxide layer 15b. Note that the SOI substrate 15 is not a limitation, and other material or method may be used for manufacturing the cantilever 2.

In addition, an opening 10d is formed on the proximal end side of the lever portion 10c that is a joining area between the lever portion 10c and the main body part 10b, whereby the lever portion 10c can be bent and deformed more easily on the proximal end side thereof. Note that the number of the openings 10d is not limited to one but may be plural or may be zero.

The heat generating resistor members 11 are formed so as to sandwich the opening 10d at both sides on the proximal end side of the lever portion 10c. The heat generating resistor member 11 is formed by a thermal diffusion method, an ion implantation method or the like for doping impurities that are generally used in a semiconductor process. Therefore, it is possible to form the heat generating resistor member 11 easily with low cost. In addition, only one layer of the heat generating resistor member 11 is formed in the lever portion 10c, and thus little membrane stress is exerted on the lever portion 10c so that no bending or deformation occurs in the lever portion 10c in advance unlike the conventional structure. Therefore, high quality of the cantilever 2 can be obtained.

The wiring part 12 is a metal wiring made of aluminum or the like and is connected electrically to the heat generating resistor member 11 so as to form a U-shape over the main body part 10b and the proximal end side of the lever portion 10c. In addition, two external connection terminals 12a that can be electrically connected externally are provided to ends of the wiring part 12 that are disposed at an end portion of the main body part 10b.

The cantilever 2 having the above-mentioned structure is fixed detachably to a slope surface block 21 with a wire or the like (not shown) via the main body part 10b, and the slope surface block 21 is fixed to a lower surface of a holder main body 20, as illustrated in FIG. 1. Thus, the cantilever 2 is fixed in a state facing the test sample S. In this case, the cantilever 2 is fixed so that the lever portion 10c is inclined at a predetermined angle with respect to a test sample surface S1 due to the slope surface block 21. Note that the holder main body 20 and the slope surface block 21 constitute a cantilever holder 22.

Figure 3:
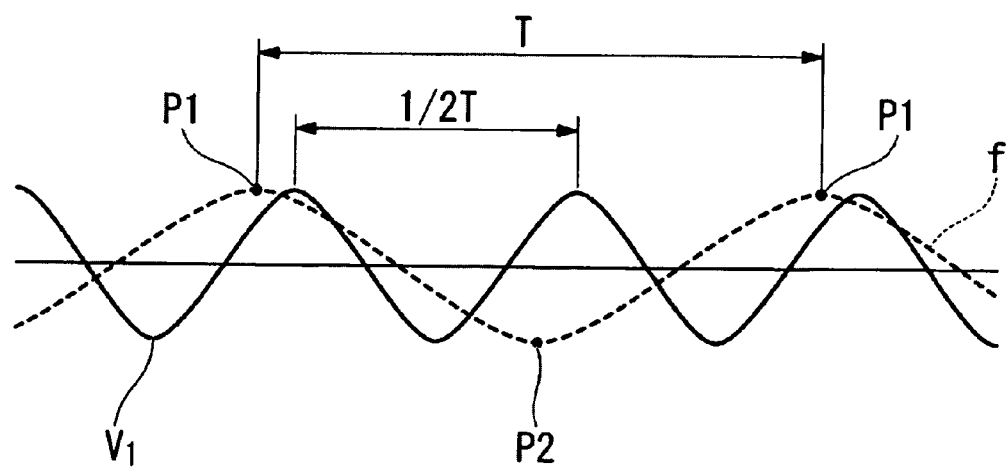
FIG. 3 is a diagram illustrating a sine wave of an oscillating voltage that is applied to a heat generating resistor member of the cantilever illustrated in FIG. 2 so as to oscillate a lever portion.

The voltage applying portion 3 applies an oscillating voltage $V_1$ to the heat generating resistor member 11 to generate heat, whereby the lever portion 10c is deformed by thermal expansion due to the heat periodically to be oscillated. Specifically, the oscillating voltage $V_1$ is applied via the external connection terminals 12a of the cantilever 2 fixed to the cantilever holder 22. In this case, the voltage applying portion 3 applies the oscillating voltage $V_1$ so that the lever portion 10c is oscillated at a frequency close to a resonance frequency f. Specifically, an AC voltage having a frequency that is substantially a half of the resonance frequency f is applied as the oscillating voltage $V_1$ as illustrated in FIG. 3.

In addition, a square root circuit 3a for computing a square root of an input voltage signal (signal proportional to an amount to deform the lever portion 10c) $V_0$ is incorporated in the voltage applying portion 3 as illustrated in FIG. 1, and a voltage corresponding to the voltage signal after the computation is applied as the oscillating voltage $V_1$.

The stage 4 supports the test sample S so as to be opposed to the probe 10a of the cantilever 2 set to the cantilever holder 22, and the stage 4 is placed on a XY scanner 25. This XY scanner 25 is placed on a Z scanner 26 that is placed on a vibration isolation table (not shown).

The XY scanner 25 and the Z scanner 26 are made up of a piezoelectric element, for example. When being applied with a voltage from a drive circuit 27, the XY scanner 25 and the Z scanner 26 move by a very small amount in accordance with the voltage application amount and a polarity of the voltage in X and Y directions parallel to the test sample surface S1 and in a Z direction perpendicular to the test sample surface S1, respectively. In other words, the XY scanner 25, the Z scanner 26, and the drive circuit 27 function as the moving mechanism 5 for moving the test sample surface S1 relatively to the probe 10a in three directions of the X and Y directions and the Z direction.

In addition, above the cantilever holder 22, there is provided a light projection portion 31 for projecting a laser beam L toward a reflection surface (not shown) formed on a backside of the lever portion 10c by using a mirror 30 as well as a light detection portion 33 for receiving the laser beam L reflected by the reflection surface by using a mirror 32. Note that the laser beam L projected from the light projection portion 31 passes through an opening part 20a of the holder main body 20 and reaches the reflection surface. Then, the laser beam L is reflected by the reflection surface, passes through the opening part 20a again, and then enters the light detection portion 33.

The light detection portion 33 is, for example, a photodetector and detects the oscillation state of the lever portion 10c based on an incident position of the laser beam L. Then, the light detection portion 33 delivers a displacement of the detected oscillation state of the lever portion 10c as a DIF signal to a preamplifier 34. In other words, the light projection portion 31, the mirrors 30 and 32, and the light detection portion 33 function as the displacement measuring mechanism 6 for measuring a displacement of the oscillation state of the lever portion 10c.

In addition, the DIF signal delivered from the light detection portion 33 is amplified by the preamplifier 34 and then sent to an AC to DC conversion circuit 35 to be converted into a DC signal, which is sent to a Z voltage feedback circuit 36. The Z voltage feedback circuit 36 performs feedback control on the drive circuit 27 so that the DC converted DIF signal is always constant. Thus, it is possible to control a distance between the probe 10a and the test sample surface S1 so that the oscillation state of the lever portion 10c is constant when the moving mechanism 5 performs the scanning action.

In addition, the Z voltage feedback circuit 36 is connected to a controlling portion 37, and the controlling portion 37 can measure a surface shape of the test sample S or detect a change in phase based on the DC converted DIF signal so that various types of physical property information of the test sample S (e.g., magnetic force or potential) can be measured.

In other words, the Z voltage feedback circuit 36 and the controlling portion 37 function as the control mechanism 7 for controlling the distance between the probe 10a and the test sample surface S1 with the moving mechanism 5 so that the oscillation state of the lever portion 10c is constant on the scanning action and for obtaining measurement data. Note that the controlling portion controls the individual components described above in a comprehensive manner.

Next, a test sample measuring method is described as follows, in which the test sample S is measured by the DFM that is one of the oscillation mode SPM with the scanning probe microscope 1 having the structure described above.

First, a setting step is performed in which the cantilever 2 is fixed to the cantilever holder 22 so that the cantilever 2 is arranged to be opposed to the test sample S. Thus, the probe 10a on the tip of the lever portion 10c and the test sample S placed on the stage 4 are opposed to each other.

Next, an alignment work is performed in which positions of the light projection portion 31 and the light detection portion 33, and an attachment state of the lever portion 10c are adjusted so that the laser beam L reliably enters the reflection surface of the lever portion 10c, and that the reflected laser beam L reliably enters the light detection portion 33.

Next, an oscillation step is performed in which the lever portion 10c is oscillated. Specifically, a voltage signal $V_0$ that is proportional to an amount to deform the lever portion 10c is supplied to the voltage applying portion 3. Then, the voltage applying portion 3 computes a square root of the voltage signal $V_0$ with the square root circuit 3a to compute a voltage signal $V_1$, and applies a voltage proportional to the voltage signal $V_1$ as the oscillating voltage across the two external connection terminals 12a of the cantilever 2. In this case, as illustrated in FIG. 3, an AC voltage having a frequency that is substantially a half of the resonance frequency f of the lever portion 10c is applied.

When this voltage is applied, the heat generating resistor member 11 connected electrically across the two external connection terminals 12a generates heat. Then, this heat causes local thermal expansion in a periphery of the heat generating resistor member 11, whereby the lever portion 10c is deformed. In addition, the oscillating voltage $V_1$ is an AC voltage, and hence the deformation is repeated periodically. As a result, the lever portion 10c is driven in an oscillated state.

In particular, the AC voltage having a frequency that is substantially a half of the resonance frequency f of the lever portion 10c is applied as the oscillating voltage $V_1$ as described above. Therefore, the heat generating resistor member 11 generates the highest heat at a peak point P1 on a positive side and at a peak point P2 on a negative side in the sine wave. In other words, the lever portion 10c is deformed and bent most in the same direction every time when the voltage $V_1$ reaches the points P1 and P2. Therefore, the lever portion 10c can be oscillated at a period that is twice that of the AC voltage. As a result, the lever portion 10c can be oscillated at the resonance frequency f. Note that FIG. 3 illustrates the resonance frequency f in the state where the period thereof is a little delayed.

In particular, the thermal expansion is utilized for oscillating the lever portion 10c in the oscillation step. Therefore, the lever portion 10c can be oscillated without using conventional means such as an oscillating source or a magnetic member. In addition, the lever portion 10c itself can be oscillated directly without affecting peripheral components, and hence oscillation characteristics of the single lever portion 10c can be obtained.

Further, after oscillating the lever portion 10c, a measurement of a Q curve is performed, and setting of an operating point (optimal value of the oscillating frequency) is performed. In this case, oscillation characteristics of the single lever portion 10c can be obtained as described above, and hence resonance characteristics of the lever portion 10c can be identified correctly. Therefore, it is possible to perform correct setting with respect to the oscillation characteristics of the lever portion 10c including an oscillation frequency, an amplitude, a phase, and the like.

Next, a measuring step is performed. More specifically, the distance between the probe 10a and the test sample surface S1 is controlled so that the oscillation state is constant, and, in this state, the drive circuit 27 drives the XY scanner 25 so as to scan the test sample S. In this case, the oscillation amplitude of the lever portion 10c tends to vary in accordance with unevenness of the test sample surface S1, and hence the laser beam L entering the light detection portion 33 (laser beam reflected by the reflection surface) has different amplitudes. The light detection portion 33 delivers the DIF signal corresponding to this amplitude to the preamplifier 34. The delivered DIF signal is amplified by the preamplifier 34 and is converted into a DC signal by the AC to DC conversion circuit 35, and then the signal is sent to the Z voltage feedback circuit 36.

The Z voltage feedback circuit 36 causes the drive circuit 27 to drive the Z scanner 26 slightly in the Z direction as the feedback control so that the DC converted DIF signal is always constant (i.e., the oscillation state of the lever portion 10c is constant). Thus, the scanning can be performed in the state where the distance between the probe 10a and the test sample surface S1 is controlled so that the oscillation state is constant. In addition, the controlling portion 37 can obtain a surface shape or various types of physical property information of the test sample S based on an up and down signal made by the Z voltage feedback circuit 36. Thus, the measurement of the test sample S is finished.

In particular, the thermal expansion is utilized for oscillating the lever portion 10c, and hence the resonance characteristics of the lever portion 10c can be recognized correctly when the Q curve is measured, whereby an ideal Q curve that does not contain unnecessary noise or the like can be obtained. Therefore, the measurement by the DFM can be performed correctly so that measurement accuracy can be improved.

In addition, according to the cantilever system 9 and the scanning probe microscope 1, the cantilever 2 of low cost and high quality is used, and hence cost can be reduced similarly, and high quality can be obtained.

Here, in this embodiment, the heat generating resistor member 11 is caused to generate heat so as to deform the lever portion 10c for oscillation, and the deformation amount is proportional to electric power corresponding to the heat value. In other words, if the electric power is increased, the deformation amount increases so that the oscillation amplitude increases. The electric power is expressed by $W=V^2/R$ (where V denotes a voltage value, and R denotes a resistance value), and the oscillation amplitude increases in proportion to the square of the voltage value.

However, in this embodiment, the voltage corresponding to the voltage signal obtained by the square root operation performed by the square root circuit 3a is used as the oscillating voltage $V_1$ corresponding to V in the above-mentioned expression. Therefore, the oscillation amplitude can be changed to be proportional to the input voltage apparently. Therefore, the oscillation adjustment can be performed in the same manner as the conventional method even in the case where the thermal expansion is utilized for oscillating the lever portion 10c. Therefore, the scanning probe microscope 1 is easy to handle and is superior in operability. In addition, the lever portion 10c can be oscillated reliably at the resonance frequency only by adjusting the frequency of the oscillating voltage that is an AC voltage, and hence setting in the oscillation step is easy.

The cantilever 2 has been described as a semiconductor manufactured from the SOI substrate 15 in the first embodiment, but this case should not be interpreted as a limitation. The cantilever 2 may be made of a metal material. Also in this case, the lever portion 10c can be deformed and oscillated by thermal expansion due to the heat generated by the heat generating resistor member 11. Therefore, similar actions and effects can be obtained.

In addition, it is preferable that the heat generating resistor member 11 be made of a material having a thermal expansion coefficient that is as large as possible.

Figure 4:
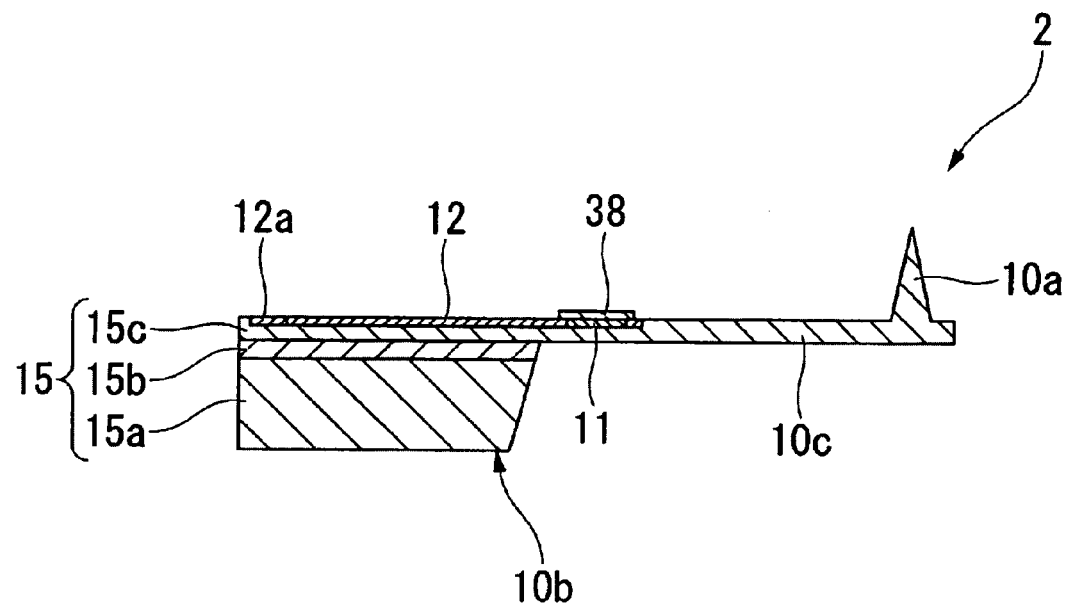
FIG. 4 is a diagram illustrating a modified example of the first embodiment according to the present invention, and is a cross section of a cantilever having a heat generating resistor member on which a thermal expansion portion is formed.

In addition, as illustrated in FIG. 4, it is possible to dispose a thermal expansion portion 38 having a thermal expansion coefficient that is larger than that of the lever portion 10c in a vicinity of the heat generating resistor member 11. Note that FIG. 4 exemplifies a thin metal film as the thermal expansion portion 38 and illustrates the case where the film is formed on the heat generating resistor member 11. Thus, when the heat generating resistor member 11 generates heat, the thermal expansion portion 38 is affected by the heat and expands thermally in an active manner. Therefore, the lever portion 10c can be deformed efficiently by little heat value so as to be oscillated. Therefore, power saving can be achieved while maintaining the measurement accuracy.

In addition, the thermal expansion portion 38 is formed only on one side of the lever portion 10c on which the probe is formed. Therefore, one side of the lever portion 10c is expanded or contracted largely affected by the heat, and the lever portion 10c can be displaced in an active manner. Therefore, the lever portion 10c can be deformed and oscillated efficiently in this point as well.

In addition, the thermal expansion portion 38 may be made of an insulating material. In this case, even if the thermal expansion portion 38 contacts directly with the heat generating resistor member 11, there is no influence on electric characteristics. Therefore, a result of measurement with high reliability can be obtained. In addition, there is no influence on electric characteristics, and hence the thermal expansion portion 38 can be formed regardless of the position at which the heat generating resistor member 11 is formed. Therefore, the cantilever 2 can be manufactured easily. From those points, it is preferable to form the thermal expansion portion 38 using an insulating material.

In addition, the voltage applying portion 3 applies the AC voltage as the oscillating voltage $V_1$ in the first embodiment, but the AC voltage should not be interpreted as a limitation. The voltage to be applied is sufficient if the heat generating resistor member 11 can generate heat periodically so that the lever portion 10c can be deformed periodically. However, if the AC voltage having a frequency that is substantially a half of the resonance frequency f is applied as the oscillating voltage $V_1$ as described above, the lever portion 10c can be resonated easily and reliably, which is preferable.

Figure 5:
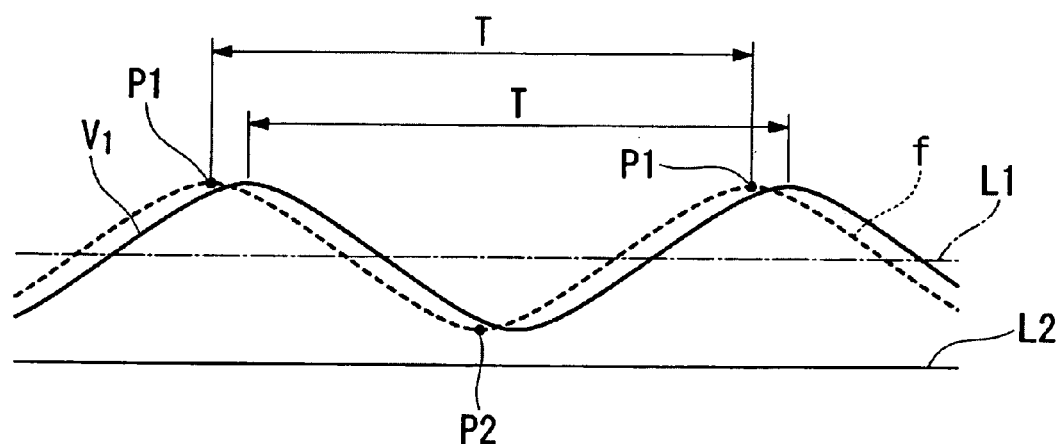
FIG. 5 is a diagram illustrating the modified example of the first embodiment according to the present invention, and is a diagram illustrating a sine wave of the oscillating voltage that is different from that of FIG. 3.

Note that it is possible to use the AC voltage illustrated in FIG. 5 as the oscillating voltage $V_1$, which has a frequency that is substantially the same as the resonance frequency f and has an amplitude center line L1 that is offset from a voltage center line L2 so as to oscillate in the positive voltage region or in the negative voltage region. Note that FIG. 5 illustrates the case where the offset is set so as to oscillate in the positive voltage region. In addition, FIG. 5 illustrates the resonance frequency f in the state where the period thereof is a little delayed.

In this case, the heat generating resistor member 11 generates the highest heat at the peak point P1 on the positive side in the sine wave of the AC voltage, and the heat generating resistor member 11 generates the lowest heat at the peak point P2 on the negative side. In other words, the lever portion 10c is deformed and bent most every time the voltage reaches the peak point P1 on the positive side. Therefore, the lever portion 10c can be oscillated at substantially the same period as that of the AC voltage. As a result, the lever portion 10c can be oscillated at the resonance frequency f.

In particular, the lever portion 10c can be oscillated at the resonance frequency easily and reliably only by the offset adjustment of the frequency of the AC voltage, and hence setting becomes easy. Therefore, it is also preferable that the oscillating voltage $V_1$ be such the AC voltage.

Second Embodiment

Next, a second embodiment of the present invention is described with reference to FIGS. 6 to 10. Note that a part in the second embodiment that is the same as the component in the first embodiment is denoted by the same reference symbol, and its description is omitted.

The second embodiment is different from the first embodiment in that the oscillation state of the lever portion 10c is measured by the optical lever method in the first embodiment while the oscillation state of the lever portion 10c is measured by a self detection method in the second embodiment.

Figure 7:
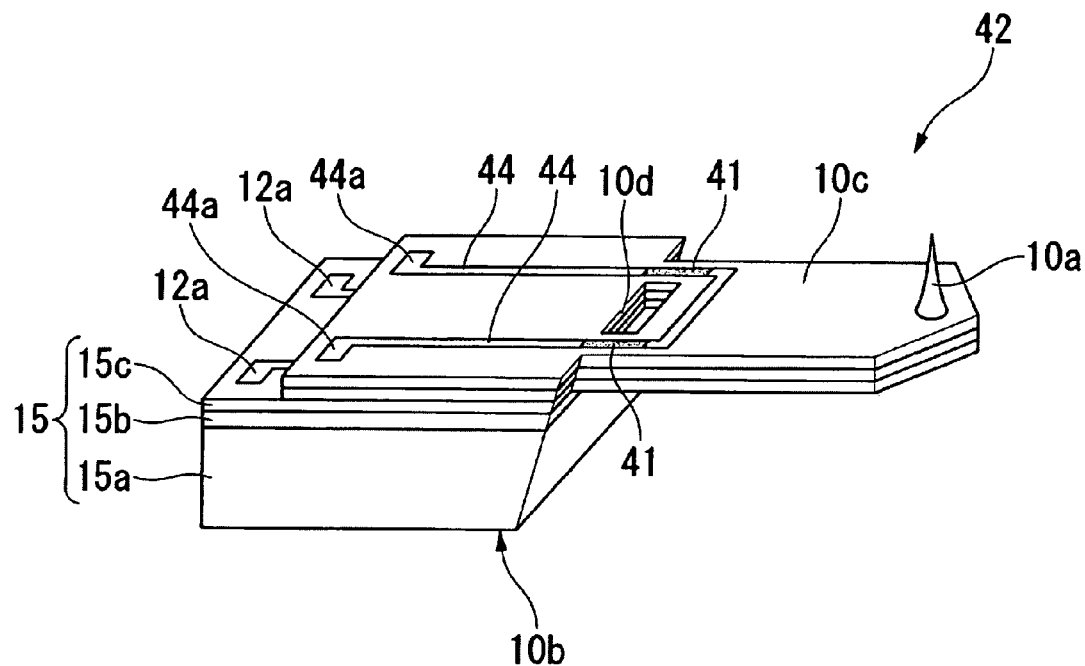
FIG. 7 is a perspective view of a cantilever illustrated in FIG. 6.
Figure 8:
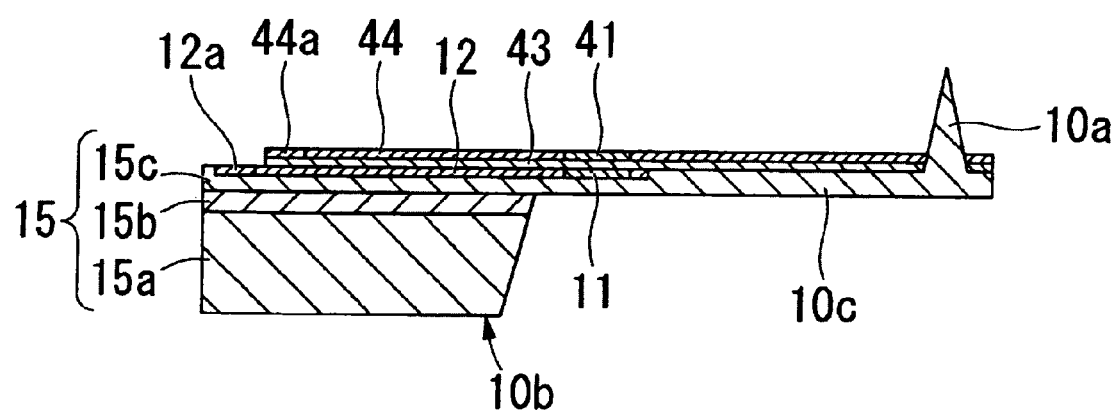
FIG. 8 is a cross section of the cantilever illustrated in FIG. 7.

Specifically, a scanning probe microscope 40 in this embodiment includes a cantilever 42 having a strain resistor 41 formed in the lever portion 10c. The cantilever 42 includes, as illustrated in FIGS. 7 and 8, an insulator film 43 formed on a top surface of the silicon active layer 15c in which the heat generating resistor member 11 and the wiring part 12 are formed, the strain resistor 41 formed on the insulator film 43, and a wiring part 44 connected electrically to the strain resistor 41. Note that it is possible to form the strain resistor 41 on the silicon active layer 15c and to form the heat generating resistor member 11 on the insulator film 43.

The strain resistor 41 has a resistance value that changes in accordance with a displacement amount of the lever portion 10c, and is a piezo-resistance element, for example. This strain resistor 41 is formed to face the heat generating resistor member 11 via the insulator film 43. The wiring part 44 is made of aluminum, for example, and is formed to face the wiring part 12 via the insulator film 43 similarly to the strain resistor 41. In addition, two external connection terminals 44a are disposed at ends of the wiring part 44.

Figure 6:
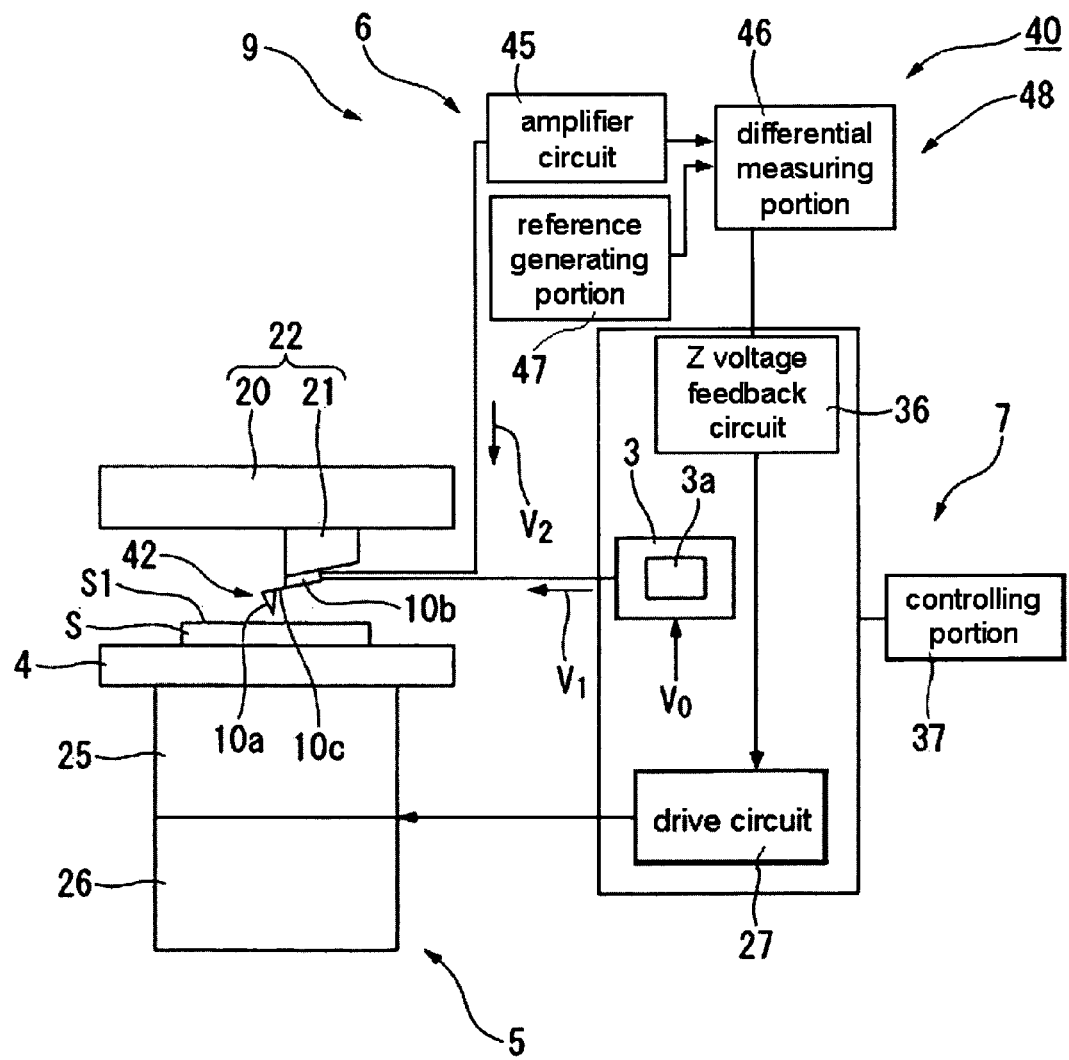
FIG. 6 is a block diagram of a scanning probe microscope illustrating a second embodiment of the present invention.

In addition, as illustrated in FIG. 6, the two external connection terminals 44a are connected to an amplifier circuit 45 for applying a detection voltage $V_2$ to the strain resistor 41 so as to detect a value of current flowing in the strain resistor 41 and for amplifying an output signal corresponding to the detected current value to deliver the amplified signal to a differential measuring portion 46. On the other hand, the differential measuring portion 46 is supplied with not only the output signal of the amplifier circuit 45 but also a reference signal from a reference generating portion 47. The reference signal is a signal that makes the output of the differential measuring portion 46 be zero when the displacement amount of the oscillation state of the lever portion 10c is zero, for example. Further, the differential measuring portion 46 compares the reference signal with the output signal sent from the amplifier circuit 45 so as to deliver a difference therebetween as an error signal to the Z voltage feedback circuit 36. In other words, this error signal is a signal corresponding to the displacement amount of the oscillation state of the lever portion 10c. Therefore, the displacement of the oscillation state of the lever portion 10c can be measured by monitoring the error signal.

In other words, the amplifier circuit 45, the differential measuring portion 46, and the reference generating portion 47 function as a displacement measuring portion 48 for applying the detection voltage $V_2$ to the strain resistor 41 and for measuring the displacement amount of the oscillation state of the lever portion 10c based on a change in value of current flowing in the strain resistor 41. In addition, the displacement measuring portion 48 and the strain resistor 41 function as the displacement measuring mechanism 6.

The case of performing the measurement by using the scanning probe microscope 40 having the structure described above is described.

In the case of this embodiment, when the measuring is performed, the displacement measuring portion 48 applies the detection voltage $V_2$, and a value of current flowing in the strain resistor 41 is monitored. Then, in this state, the test sample S is scanned. Then, the oscillation state of the lever portion 10c is displaced due to an action of an interatomic force exerted between the probe 10a and the test sample S, and therefore a resistance value of the strain resistor 41 changes in accordance with the displacement amount. Therefore, a value of current flowing in the strain resistor 41 changes. Then, the amplifier circuit 45 delivers the output signal corresponding to the change in current to the differential measuring portion 46.

The differential measuring portion 46 compares the received output signal with the reference signal received from the reference generating portion 47 so as to compute the error signal corresponding to the displacement amount of the oscillation state of the lever portion 10c, and delivers the error signal to the Z voltage feedback circuit 36. Thus, the Z voltage feedback circuit 36 can measure the displacement amount of the oscillation state of the lever portion 10c. Then, the Z voltage feedback circuit 36 controls the drive circuit 27 to move the stage 4 in the Z direction based on the error signal, whereby a distance between the probe 10a and the test sample surface S1 is made constant. In other words, the stage 4 is controlled so that the error signal becomes close to zero.

As a result, the cantilever 42 can be caused to scan while performing height control so that the detected displacement amount of the oscillation state of the lever portion 10c becomes constant. Thus, the DFM measurement of the test sample S can be performed.

In particular, the cantilever 42 can function as a self detection type (self displacement detection type) in the case of this embodiment, and hence it is not necessary to perform the alignment work (adjustment work of the light path for the laser beam L) that is unique to an optical lever method like the first embodiment when the oscillation state of the lever portion 10c is measured. Therefore, the handling becomes easier, and the test sample S can be measured easily in a speedier manner.

Figure 9:
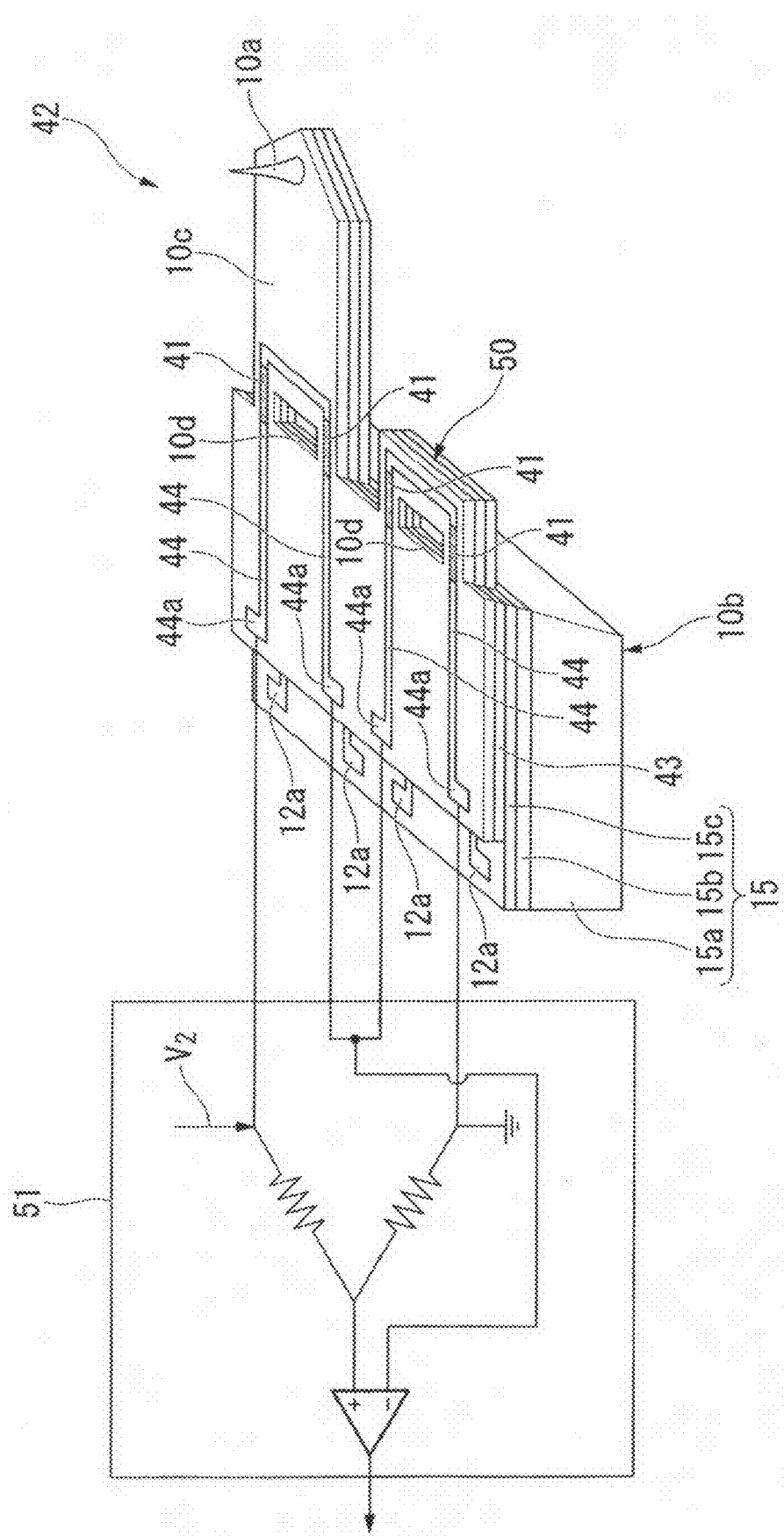
FIG. 9 is a diagram illustrating a modified example of the second embodiment according to the present invention, and is a diagram illustrating a relationship between a cantilever having a temperature compensating reference electrode and a Wheatstone bridge circuit.

Note that it is possible to dispose a temperature compensating reference electrode 50 at the vicinity of the lever portion 10c as illustrated in FIG. 9 in the second embodiment.

The temperature compensating reference electrode 50 is supported by the main body part 10b in a cantilever manner so as to be adjacent to the lever portion 10c, for example. However, it is not necessary to form the temperature compensating reference electrode 50 integrally with the cantilever 42. It is possible to form the temperature compensating reference electrode 50 as a single lever separated from the cantilever 42. However, if they are formed integrally, it is preferable because the temperature compensating reference electrode 50 can be disposed more close to the lever portion 10c.

This temperature compensating reference electrode 50 is, similarly to the lever portion 10c, provided with the opening 10d and the wiring part 44 having the strain resistor 41 and the two external connection terminals 44a.

Further, the two external connection terminals 44a on the side of the lever portion 10c and the two external connection terminals 44a on the side of the temperature compensating reference electrode 50 are connected to a Wheatstone bridge circuit 51 instead of the amplifier circuit 45. This Wheatstone bridge circuit 51 compares values of current flowing in the two strain resistors 41 so as to obtain a difference therebetween, amplifies an output signal corresponding to a current value of the obtained difference, and then delivers the result to the differential measuring portion 46. In other words, the displacement measuring portion 48 in this case measures the displacement amount of the oscillation state of the lever portion 10c based on a change in the difference current value.

Here, a resistance value of the strain resistor 41 changes in accordance with not only the displacement of the lever portion 10c but also temperature change. However, because the Wheatstone bridge circuit 51 refers to a value of current flowing in the strain resistor 41 on the side of the temperature compensating reference electrode 50, an unnecessary change in the resistance value due to temperature change can be canceled so that an influence of temperature can be eliminated. Therefore, the test sample S can be measured more accurately so that reliability in a result of measurement can be improved.

Figure 10:
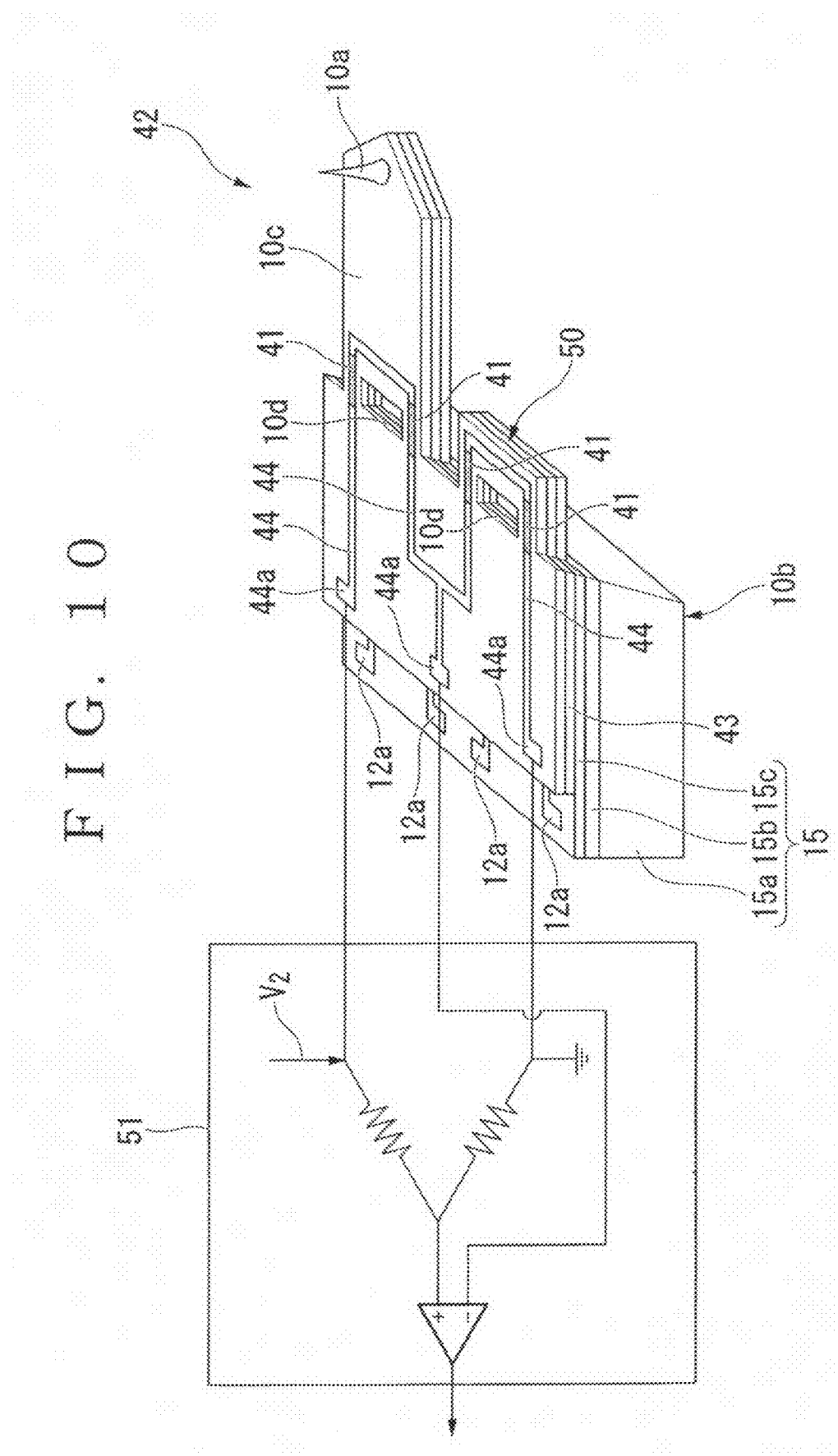
FIG. 10 is a diagram illustrating a modified example of the cantilever illustrated in FIG. 9.

Note that two of the four external connection terminals 44a connected to the two strain resistors 41 are ground terminals, and those parts may be joined to the wiring part 44 in the midpoint so as to make the common external connection terminal 44a. In this case, there are three external connection terminals 44a as illustrated in FIG. 10. In this case, too, similar actions and effects can be obtained.

Note that when the temperature compensating reference electrode 50 is used, it is preferable to use one having a resonance frequency higher than that of the lever portion 10c. In this way, it is possible to prevent the temperature compensating reference electrode 50 from being resonated at a frequency lower than the resonance frequency of the lever portion 10c. Therefore, a stable operation can be performed.

In addition, in the case where the temperature compensating reference electrode 50 and the lever portion 10c have the same thickness, a length of the temperature compensating reference electrode 50 should be shorter than that of the lever portion 10c. However, if the length is too short, a difference may occur in thermal characteristics. Therefore, it is preferable that the length should be in a range from 1/5 to 4/5 of the length of the lever portion 10c.

In addition, the heat generating resistor member 11 and the strain resistor 41 are formed in the lever portion 10c in the second embodiment, but it is possible to form only the heat generating resistor member 11 so that the heat generating resistor member 11 also functions as the strain resistor. In this case, the oscillating voltage $V_1$ is applied to the heat generating resistor member 11 to generate heat, and the lever portion 10c is oscillated. At the same time, a value of current flowing in the heat generating resistor member 11 is monitored. In this case, too, similar actions and effects can be obtained.

In particular, the heat generating resistor member 11 alone has two roles including a role of oscillating the lever portion 10c and a role of measuring the oscillation state of the lever portion 10c, and hence a structure of the cantilever can be simplified. In addition, cost of components constituting the cantilever can be reduced.

Note that the technical scope of the present invention is not limited to the embodiments described above, and various modifications may be made thereto without departing from the spirit of the present invention.

For instance, in each of the embodiments, it is possible to apply the oscillating voltage $V_1$ to the heat generating resistor member 11 every time so as to continue to oscillate the lever portion 10c while measuring the displacement amount of the oscillation state of the lever portion 10c. In other words, it is possible to perform the oscillation step and the measuring step simultaneously. In this case, the test sample S can be measured correctly every time.

In addition, it is possible to perform the oscillation step and the measuring step not simultaneously but alternately at time intervals. In this case, the oscillating action of the lever portion 10c and the measurement of the oscillation state of the lever portion 10c can be performed alternately, and hence each action can be easily controlled in a stable and assured manner.

In particular, when the time intervals are provided, it is preferable to set so that the following expression is satisfied.

$$S \leq q/f,$$

where S denotes the time interval, q denotes the Q value, and f denotes the resonance frequency. In this way, the lever portion 10c can be oscillated again without being largely attenuated. Therefore, the lever portion 10c can be reliably maintained in the resonated state.

In addition, each of the embodiments exemplifies the test sample scanning method in which the test sample S is moved in three dimensional directions, but this method should not be interpreted as a limitation. It is possible to adopt another scanning method in which the cantilever is moved in three dimensional directions. In this case, too, actions and effects similar to the test sample scanning method can be obtained except for a difference of the scanning method. Note that it is possible to adopt a structure in which both the test sample S and the cantilever are movable in three dimensional directions.

In addition, each of the embodiments exemplifies the case where the DFM measurement is performed as an example of the oscillation mode SPM, but this case should not be interpreted as a limitation. Similar actions and effects can be obtained, for example, in a magnetic force microscope (MFM), in which a cantilever having a probe capable of detecting a magnetic field is oscillated similarly, and a deformation amplitude or phase of the cantilever in this state is detected so that a magnetic distribution, a magnetic domain structure or the like of the magnetic test sample S is measured.

In addition, similar actions and effects can be obtained in a lateral force modulation friction force microscope (LM-FFM), in which the test sample S is oscillated laterally in the horizontal direction parallel to the test sample surface S1, or the lever portion 10c is oscillated laterally in the horizontal direction parallel to the test sample surface S1 during the AFM operation, and a torsional oscillation amplitude of the lever portion 10c in this state is detected so that a friction force distribution is measured, or in a viscoelastic AFM (VE-AFM or micro viscoelasticity measurement-atomic force microscope), in which the test sample S is oscillated as a microoscillation in the Z direction perpendicular to the test sample surface S1, or the lever portion 10c is oscillated as a microoscillation in the Z direction perpendicular to the test sample surface S1 during the AFM operation so that a periodical force is exerted, and a deformation amplitude, a sine component or a cosine component of the lever portion 10c in this state is detected so that a viscoelasticity distribution is measured.

Further, in each of the embodiments, it is possible to bend the lever portion 10c forcedly utilizing the thermal expansion instead of oscillating the lever portion 10c. Therefore, it is possible to press the probe 10a formed on the tip of the lever portion 10c to the test sample S forcedly or to separate the probe 10a therefrom forcedly on the contrary. In this way, more complicated operation can be performed in accordance with a situation so that the test sample S can be measured in various manners.

In addition, it is possible to adopt a multitype cantilever having a plurality of lever portions 10c supported by the main body part 10b in a cantilever manner and to bend only the to-be-used lever portion 10c forcedly toward the side of the test sample S for measurement. It is also possible to bend other lever portions 10c except for the to-be-used lever portion 10c forcedly to be separated from the test sample S. In this way, the thermal expansion can be utilized for various uses unlike the conventional one.

In addition, the embodiments described above exemplify the case where the cantilever system 9 is applied to the scanning probe microscope 1, but this case should not be interpreted as a limitation. The cantilever system 9 can be applied to various apparatuses.

For instance, the cantilever system 9 may be applied to a mass sensor that adsorbs a substance for measuring a micro weight of the substance from an amount of the adsorption. In addition, the cantilever system 9 may be applied to an elasticity measuring apparatus for measuring elasticity of the test sample, or may be applied to a manipulation apparatus that is capable of grasping the test sample or the like or handling the same in various manners. In addition, when the cantilever system 9 is applied to such various apparatuses, it is also possible to adopt the cantilever having no probe 10a on the tip of the lever portion 10c. In other words, the probe is not essential for the cantilever according to the present invention.

Example

Next, an example is described, which is the case where a voltage is actually applied to the resistor member periodically to oscillate the lever portion at a frequency close to the resonance frequency.

Figure 11:
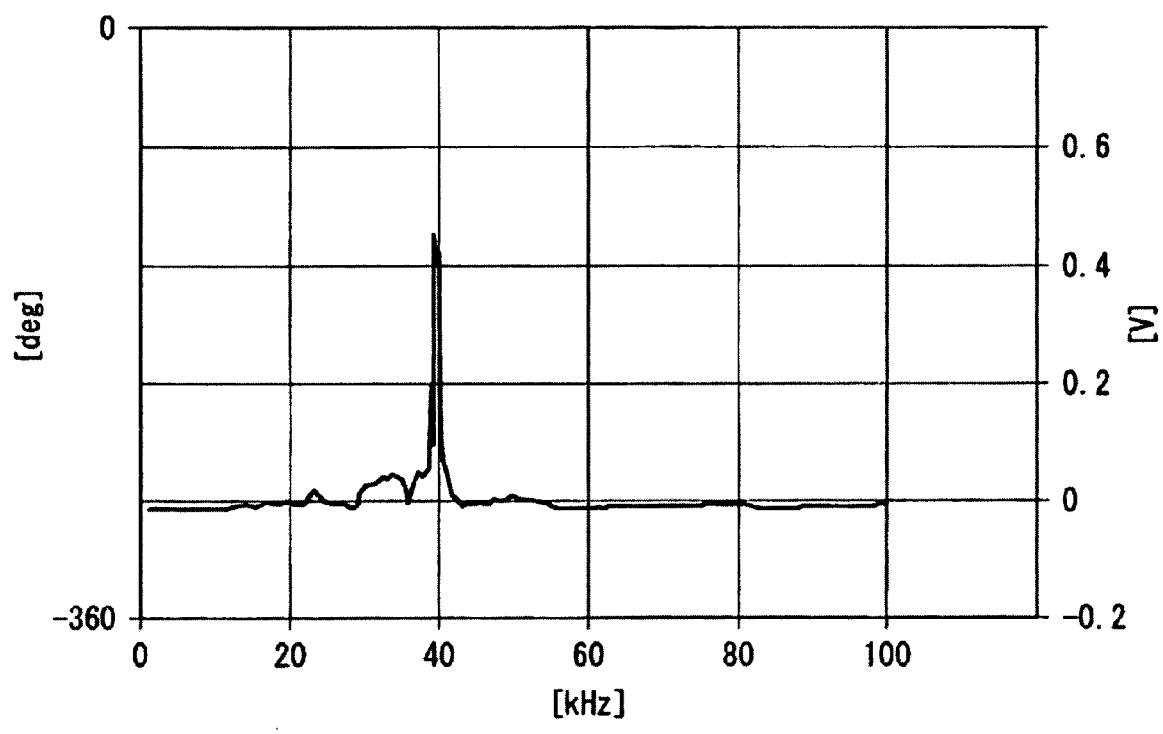
FIG. 11 illustrates a Q curve when the lever portion is actually oscillated by utilizing an oscillating source that is commonly used.

First, FIG. 11 illustrates a Q curve (indicating the resonance characteristics) measured by using an oscillating source utilizing a piezoelectric element that has been generally used conventionally so as to oscillate the lever portion of the cantilever. Note that the lower limit of the measurement frequency was set to 1 kHz while the upper limit thereof was set to 100 kHz. As a result, a peak top was confirmed at 39.485 kHz as illustrated in FIG. 11. However, it was also confirmed that the Q curve was disturbed by an influence of an oscillation of a portion other than the lever portion (secondary oscillation) simultaneously. The reason of this is considered that oscillation of the oscillating source propagated through peripheral components other than the cantilever so as to oscillate the peripheral components. As a result, the oscillation characteristics of the cantilever were affected so that an ideal Q curve could not be obtained.

Next, the resistor member is formed in the lever portion having the same resonance characteristics as the lever portion described above, and the AC voltage was applied to the resistor member to generate heat periodically so that the lever portion was oscillated. Note that the lower limit of the measurement frequency was set to 1 kHz while the upper limit thereof was set to 100 kHz. On this occasion, the AC voltage having the center of zero volts was applied.

Figure 12:
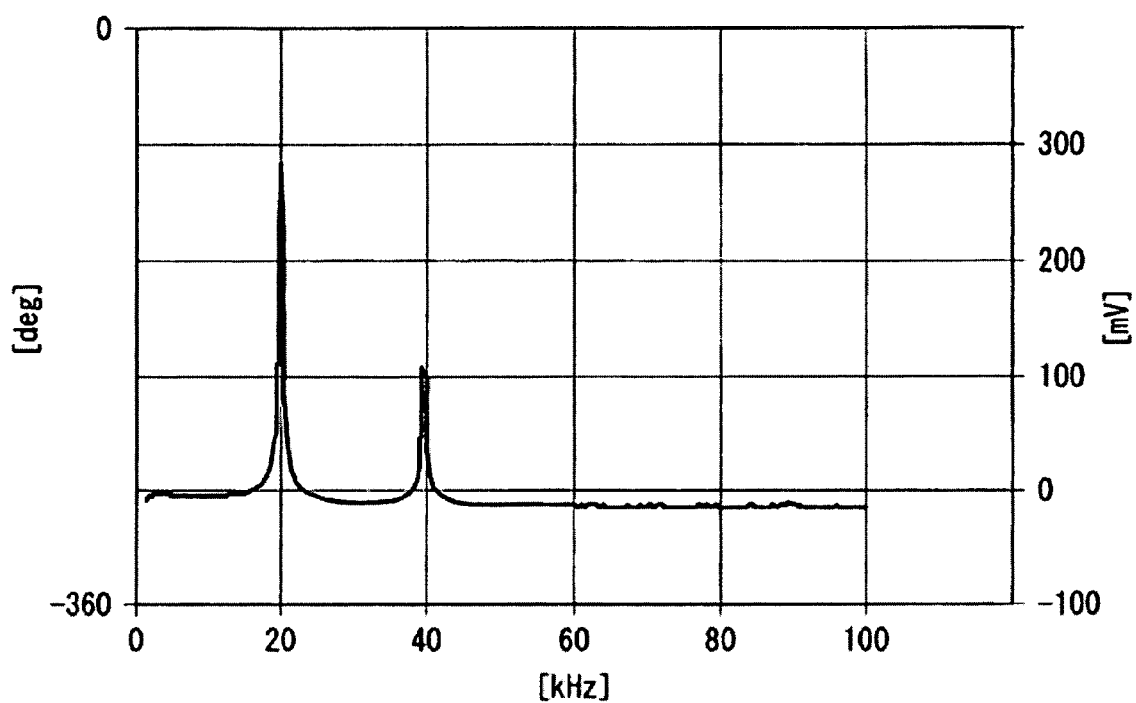
FIG. 12 illustrates a Q curve when the lever portion is oscillated by applying an AC voltage having a center of zero volts to the heat generating resistor member formed in the lever portion.

As a result, a large amplitude could be confirmed at 19.743 kHz that is a frequency substantially a half of the resonance frequency of the lever portion (39.485 kHz) as illustrated in FIG. 12. From this fact, it was confirmed actually that the lever portion could be oscillated at the resonance frequency by applying the AC voltage having a frequency substantially a half of the resonance frequency of the lever portion to the resistor member as described above with reference to FIG. 3.

Next, the resistor member was formed in the lever portion having the same resonance characteristics as the lever portion described above, and the AC voltage was applied to the resistor member to generate heat periodically so that the lever portion was oscillated. Note that the lower limit of the measurement frequency was set to 1 kHz while the upper limit thereof was set to 100 kHz. On this occasion, the AC voltage was applied in the positive voltage region so that the amplitude did not cross the zero volts line and the amplitude center line was offset from the voltage center line (zero volts line).

As a result, a large amplitude could be confirmed at 39.500 kHz that is a frequency substantially the same as the resonance frequency of the lever portion (39.485 kHz) as illustrated in FIG. 13. From this fact, it was confirmed actually that the lever portion could be oscillated at the resonance frequency by applying the AC voltage having a frequency close to the resonance frequency of the lever portion while performing offset adjustment of the frequency as described above with reference to FIG. 5.

In particular, in each case illustrated in FIG. 12 or 13, a very beautiful/curve (faithful to the resonance characteristics) without secondary oscillation could be obtained unlike the case illustrated in FIG. 11. This is because the thermal expansion of the resistor member was utilized unlike the case where the oscillating source was used, and accordingly only the lever portion could be directly oscillated without oscillating the peripheral structural members. Thus, it was actually confirmed that a special effect could be obtained unlike the conventional structure.

What is claimed is:
1. A cantilever system comprising:
a cantilever comprising a lever portion having a proximal end that is supported by a main body part, a probe formed on a distal end portion of the lever portion, and a resistor member formed in the lever portion and that generates heat through application of an oscillating AC voltage to deform the lever portion by thermal expansion due to the heat to oscillate the lever portion and the probe;

a voltage applying portion for applying an AC voltage to the resistor member; and a displacement measuring mechanism for measuring a displacement of the lever portion, wherein when the voltage applying portion periodically applies an AC voltage having an amplitude center line that is offset from a voltage center line, the lever portion oscillates at a frequency close to a resonance frequency of the lever portion in one of a positive voltage region and a negative voltage region, and when the voltage applying portion periodically applies an AC voltage having an amplitude center line that is not offset from the voltage center line, the lever portion oscillates at a frequency that is substantially a half of the resonance frequency of the lever portion across a positive voltage region and a negative voltage region.

2. A cantilever system according to claim 1, wherein the lever portion has a thermal expansion portion formed therein in a vicinity of the resistor member, the thermal expansion portion being made of a material having a thermal expansion coefficient larger than that of the lever portion.

3. A cantilever system according to claim 2, wherein the thermal expansion portion is formed on one of both sides of the lever portion.

4. A cantilever system according to claim 2, wherein the thermal expansion portion is made of a material comprising an insulating material.

5. A cantilever system according to claim 1, wherein the lever portion comprises a self displacement sensing lever.

6. A cantilever system according to claim 5, wherein the lever portion comprises a self displacement sensing lever provided with a first strain resistor having a resistance value that changes in accordance with a displacement amount.

7. A cantilever system according to claim 6, wherein the
a displacement measuring mechanism measures the displacement of the lever portion based on a change in value of a current flowing in the first strain resistor.

8. A cantilever system according to claim 7, wherein the voltage applying portion applies a voltage to the first strain resistor to cause the first strain resistor to generate heat and operate as the resistor member.

9. A cantilever system according to claim 8, wherein the displacement measuring mechanism detects a voltage applied to the first strain resistor by the voltage applying portion and a change in resistance value of the first strain resistor due to a current generated by the voltage, and measures a displacement of the lever portion based on the voltage and the change thus detected.

10. A cantilever system according to claim 7, wherein:
the cantilever includes a temperature compensating reference electrode in which a second strain resistor is incorporated; and
the displacement measuring mechanism measures a displacement of the lever portion based on a difference in value between currents flowing in the first strain resistor and the second strain resistor.

11. A cantilever system according to claim 10, wherein the displacement measuring mechanism measures a difference in value between currents flowing in the first strain resistor and the second strain resistor by using a Wheatstone bridge circuit.

12. A cantilever system according to claim 10, wherein the displacement measuring mechanism measures a difference in value between currents flowing in the first strain resistor and the second strain resistor by using a differential amplifier circuit.

13. A cantilever displacement measuring method of measuring a displacement of the cantilever of the cantilever system according to claim 6, the method comprising:
applying a voltage to the resistor member; and
measuring a displacement of the lever portion based on a change in value of a current flowing in the first strain resistor.

14. A cantilever displacement measuring method according to claim 13, further comprising applying a voltage to the first strain resistor to cause the first strain resistor to generate heat and operate as the resistor member.

15. A cantilever displacement measuring method according to claim 14, further comprising detecting the voltage applied to the first strain resistor and the change of a resistance value of the first strain resistor based on a current generated by the voltage, to thereby measure a displacement of the lever portion.

16. A cantilever displacement measuring method according to claim 13, further comprising referring to a temperature compensating reference electrode in which a second strain resistor is incorporated, and measuring a displacement of the lever portion based on a difference in value between currents flowing in the first strain resistor and the second strain resistor.

17. A cantilever displacement measuring method according to claim 16, wherein the difference in value between currents flowing in the first strain resistor and the second strain resistor is measured using a Wheatstone bridge circuit.

18. A cantilever displacement measuring method according to claim 16, wherein the difference in value between currents flowing in the first strain resistor and the second strain resistor is measured using a differential amplifier circuit.

19. A cantilever system according to claim 1, wherein the voltage applying portion includes a square root circuit for computing a square root of a voltage value, and the voltage applying portion converts a voltage signal that is proportional to an amount to be deformed by the square root circuit into a voltage, and applies the voltage to the resistor member.

20. A cantilever system according to claim 1, wherein the voltage applying portion increases the voltage to compensate a temperature decrease of the resistor member due to thermal radiation, and applies the increased voltage to the resistor member.

21. A cantilever system according to claim 1, wherein the voltage applying portion and the displacement measuring mechanism are operated alternately in a time cycle.

22. A cantilever system according to claim 21, wherein the voltage applying portion and the displacement measuring mechanism are operated alternately in a time cycle satisfying the expression below, $$S \leq q/f,$$

where S denotes the time cycle, q denotes a Q value, and f denotes the resonance frequency of the cantilever lever portion.

23. A scanning probe microscope comprising the cantilever system according to claim 1.

24. A cantilever comprising:
a deformable lever portion having a proximal end portion that is supported in a cantilever manner by a main body part and having a probe formed on a distal end portion thereof; and two resistor members positioned on the lever portion in spaced-apart relation in a widthwise direction of the lever portion and responsive to an applied oscillating voltage to generate heat that deforms the lever portion by localized thermal expansion to effect oscillation of the lever portion and the probe.

25. A cantilever according to claim 24; including wiring electrically connected to the two resistor members and terminating in connection terminals for applying alternating voltage to each resistor member.

26. A cantilever according to claim 25; wherein the lever portion has one or more openings in the proximal end portion thereof to facilitate deformation and oscillation of the lever portion, and each resistor member is positioned adjacent the one or more openings.

27. A cantilever according to claim 24; wherein the lever portion has one or more openings in the proximal end portion thereof to facilitate deformation and oscillation of the lever portion, and each resistor member is positioned adjacent the one or more openings.

28. A cantilever according to claim 24; including a thermal expansion portion provided on the lever portion in the vicinity of the resistor members, the thermal expansion portion having a thermal expansion coefficient larger than that of the lever portion.

29. A cantilever according to claim 28; wherein the thermal expansion portion is made of insulating material.

30. A cantilever according to claim 24; including strain resistors positioned on the lever portion, each strain resistor having a resistance value that changes in accordance with displacement of the lever portion.

31. A cantilever according to claim 30; wherein each strain resistor is superposed over a respective resistor member.

32. A cantilever according to claim 30; wherein the lever portion is comprised of plural layers superposed one over another, the resistor members being provided on one layer and the strain resistors being provided on another layer which is insulated from the one layer.

* * * * *